US008847975B2

(12) United States Patent
Van Belle

(10) Patent No.: US 8,847,975 B2
(45) Date of Patent: Sep. 30, 2014

(54) METHOD AND DEVICE TO ENHANCE IMAGE QUALITY IN DIGITAL VIDEO PROCESSING SYSTEMS USING DITHERING

(75) Inventor: Ronny Van Belle, Lendelede (BE)

(73) Assignee: Barco N.V., Kortrijk (BE)

( * ) Notice: Subject to any disclaimer, the term of this patent is extended or adjusted under 35 U.S.C. 154(b) by 622 days.

(21) Appl. No.: 12/399,657

(22) Filed: Mar. 6, 2009

(65) Prior Publication Data

US 2010/0259553 A9    Oct. 14, 2010

(30) Foreign Application Priority Data

Mar. 7, 2008 (EP) ..................................... 08152483

(51) Int. Cl.
*G09G 5/02* (2006.01)
*G06T 11/00* (2006.01)

(52) U.S. Cl.
CPC .................................... *G06T 11/001* (2013.01)
USPC ............................ 345/596; 345/597; 345/588

(58) Field of Classification Search
CPC combination set(s) only.
See application file for complete search history.

(56) References Cited

U.S. PATENT DOCUMENTS

| | | | |
|---|---|---|---|
| 3,739,082 A | | 6/1973 | Lippel |
| 4,574,344 A | * | 3/1986 | Harris et al. ................... 703/26 |
| 6,441,867 B1 | * | 8/2002 | Daly ............................ 348/607 |
| 6,795,085 B1 | | 9/2004 | Doherty et al. |
| 7,369,276 B2 | * | 5/2008 | Couwenhoven et al. ..... 358/3.03 |
| 2004/0125117 A1 | * | 7/2004 | Suzuki et al. ................. 345/690 |
| 2005/0185001 A1 | * | 8/2005 | Feng et al. .................... 345/597 |
| 2005/0195438 A1 | * | 9/2005 | Couwenhoven et al. ..... 358/3.05 |
| 2005/0276502 A1 | | 12/2005 | Brown Elliott et al. |

OTHER PUBLICATIONS

Robert Ulichney, Dithering with Blue Noise, Jan. 1988, vol. 76, No. 1, Proceedings of the IEEE, pp. 56-79.*
Communication of the European Patent Office regarding European Patent Application No. 08152483.7, Apr. 6, 2010.
Kevin Spaulding et al.: "Methods for generating blue-noise dither matrices for digital halftoning" Journal of Electronic Imaging: vol. 6, No. 2, Apr. 4, 2007, pp. 208-230, XP002492481.
Robert A. Ulichney: "Dithering with Blue Noise" Proceedings of the IEEE: vol. 76, No. 1, Jan. 1, 1988, pp. 56-79, XP002034911.
Theophano Mitsa et al.: "Digital Halftoning using a blue noise mask" ICASSP, New York, IEEE, US, vol. Conf. 16, Apr. 14, 1991; pp.. 2809-2812, XP010043590.
Aronov Boris et al.: "A Generalization of Magic Squares with Applications to Digital Halftoning" Theory of Computing Systems formerly: vol. 42, No. 2, Jun. 27, 2007; pp. 143-156, XP002514028.
Search Report of European Patent Office regarding European Patent Application No. 08152483.7, Feb. 23, 2009.

* cited by examiner

*Primary Examiner* — Kee M Tung
*Assistant Examiner* — Leon T Cain, II
(74) *Attorney, Agent, or Firm* — Bacon & Thomas, PLLC

(57) ABSTRACT

A processing chain for a digital image signal (12) applies a dither pattern (14), having a first spectrum, to the image signal at a point in the processing chain. A further noise pattern (10) is applied to the image signal during the processing chain. The noise pattern (10) has a second spectrum which is configured such that the combination of the first spectrum and second spectrum results in a more continuous spectrum. Another aspect describes a noise pattern (10) which can be used as an offset dither pattern for digital images, especially before color bit depth reduction. The noise pattern comprises an array of values which are linearly distributed across a range, with each value in the range occurring an equal number of times. Similar values at extreme ends of the range of values are dispersed within the array. The pattern has a Poisson-disk two-dimensional spectral energy distribution. Values are positioned in the array based on distance to similar values in neighboring repetitions of the array. The array has "magic square" properties.

12 Claims, 15 Drawing Sheets

P(1) = column(0) XOR line(0)

Most significant bit P(1)

| column(1..0) / line(1..0) | 0 | 1 |
|---|---|---|
| 0 | 0 | 1 |
| 1 | 1 | 0 |

Fig. 1a

P(0) = column(0)

Least significant bit P(0)

| Column(1..0) / line(1..0) | 0 | 1 |
|---|---|---|
| 0 | 0 | 1 |
| 1 | 0 | 1 |

Fig. 1b

Resulting 2x2 pattern P(1..0)

| column(1..0) / line(1..0) | 0 | 1 |
|---|---|---|
| 0 | 0 | 3 |
| 1 | 2 | 1 |

Fig. 1c

Most significant bit P(3)

| column(1..0) / line(1..0) | 00 | 01 | 10 | 11 |
|---|---|---|---|---|
| 00 | 0 | 1 | 0 | 1 |
| 01 | 1 | 0 | 1 | 0 |
| 10 | 0 | 1 | 0 | 1 |
| 11 | 1 | 0 | 1 | 0 |

Fig. 2a $P(2) = column(0)$

Second most significant bit P(2)

| column(1..0) / line(1..0) | 00 | 01 | 10 | 11 |
|---|---|---|---|---|
| 00 | 0 | 1 | 0 | 1 |
| 01 | 0 | 1 | 0 | 1 |
| 10 | 0 | 1 | 0 | 1 |
| 11 | 0 | 1 | 0 | 1 |

Fig. 2b $P(1) = column(0)\ XOR\ column(1)\ XOR\ line(1)$

Second least significant bit P(1)

| column(1..0) / line(1..0) | 00 | 01 | 10 | 11 |
|---|---|---|---|---|
| 00 | 0 | 1 | 1 | 0 |
| 01 | 0 | 1 | 1 | 0 |
| 10 | 1 | 0 | 0 | 1 |
| 11 | 1 | 0 | 0 | 1 |

Fig. 2c $P(0) = column(0)\ XOR\ line(1)$

Least significant bit P(0)

| column(1..0) / line(1..0) | 00 | 01 | 10 | 11 |
|---|---|---|---|---|
| 00 | 0 | 1 | 0 | 1 |
| 01 | 0 | 1 | 0 | 1 |
| 10 | 1 | 0 | 1 | 0 |
| 11 | 1 | 0 | 1 | 0 |

Fig. 2d

Resulting 4x4 Pattern P(3..0)

| column(1..0) / line(1..0) | 00 | 01 | 10 | 11 |
|---|---|---|---|---|
| 00 | 0 | 15 | 2 | 13 |
| 01 | 8 | 7 | 10 | 5 |
| 10 | 3 | 12 | 1 | 14 |
| 11 | 11 | 4 | 9 | 6 |

Fig. 2e

Odd frames only
column(1..0) /
line(1..0)

Resulting 4x4 4bit Pattern(3..0)

| | 00 | 01 | 10 | 11 |
|---|---|---|---|---|
| 00 | 15 | 0 | 13 | 2 |
| 01 | 7 | 8 | 5 | 10 |
| 10 | 12 | 3 | 14 | 1 |
| 11 | 4 | 11 | 6 | 9 |

Fig. 3

2bit repetitive 2x2 pattern

| 0 | 0,75 | 0 | 0,75 |
|---|---|---|---|
| 0,5 | 0,25 | 0,5 | 0,25 |
| 0 | 0,75 | 0 | 0,75 |
| 0,5 | 0,25 | 0,5 | 0,25 |

+

Video data in certain area

| 7 | 7 | 7 | 7 |
|---|---|---|---|
| 7 | 7 | 7 | 7 |
| 7 | 7 | 7 | 7 |
| 7 | 7 | 7 | 7 |

=

Added together

| 7 | 7,75 | 7 | 7,75 |
|---|---|---|---|
| 7,5 | 7,25 | 7,5 | 7,25 |
| 7 | 7,75 | 7 | 7,75 |
| 7,5 | 7,25 | 7,5 | 7,25 |

>

Truncated value to be transmitted

| 7 | 7 | 7 | 7 |
|---|---|---|---|
| 7 | 7 | 7 | 7 |
| 7 | 7 | 7 | 7 |
| 7 | 7 | 7 | 7 |

Fig. 4a

2bit repetitive 2x2 pattern

| 0 | 0,75 | 0 | 0,75 |
|---|---|---|---|
| 0,5 | 0,25 | 0,5 | 0,25 |
| 0 | 0,75 | 0 | 0,75 |
| 0,5 | 0,25 | 0,5 | 0,25 |

+

Video data in certain area

| 7,25 | 7,25 | 7,25 | 7,25 |
|---|---|---|---|
| 7,25 | 7,25 | 7,25 | 7,25 |
| 7,25 | 7,25 | 7,25 | 7,25 |
| 7,25 | 7,25 | 7,25 | 7,25 |

=

Added together

| 7,25 | 8 | 7,25 | 8 |
|---|---|---|---|
| 7.75 | 7,5 | 7,75 | 7,5 |
| 7,25 | 8 | 7,25 | 8 |
| 7.75 | 7,5 | 7,75 | 7,5 |

>

Truncated value to be transmitted

| 7 | 8 | 7 | 8 |
|---|---|---|---|
| 7 | 7 | 7 | 7 |
| 7 | 8 | 7 | 8 |
| 7 | 7 | 7 | 7 |

Fig. 4b

2bit repetitive 2x2 pattern

| 0 | 0,75 | 0 | 0,75 |
|---|---|---|---|
| 0,5 | 0,25 | 0,5 | 0,25 |
| 0 | 0,75 | 0 | 0,75 |
| 0,5 | 0,25 | 0,5 | 0,25 |

+

Video data in certain area

| 7.5 | 7.5 | 7.5 | 7.5 |
|---|---|---|---|
| 7.5 | 7.5 | 7.5 | 7.5 |
| 7.5 | 7.5 | 7.5 | 7.5 |
| 7.5 | 7.5 | 7.5 | 7.5 |

=

Added together

| 7.5 | 8.25 | 7.5 | 8.25 |
|---|---|---|---|
| 8 | 7.75 | 8 | 7.75 |
| 7.5 | 8.25 | 7.5 | 8.25 |
| 8 | 7.75 | 8 | 7.75 |

>

Truncated value to be transmitted

| 7 | 8 | 7 | 8 |
|---|---|---|---|
| 8 | 7 | 8 | 7 |
| 7 | 8 | 7 | 8 |
| 8 | 7 | 8 | 7 |

Fig. 4c

2bit repetitive 2x2 pattern

| 0 | 0,75 | 0 | 0,75 |
|---|---|---|---|
| 0,5 | 0,25 | 0,5 | 0,25 |
| 0 | 0,75 | 0 | 0,75 |
| 0,5 | 0,25 | 0,5 | 0,25 |

+

Video data in certain area

| 7.75 | 7.75 | 7.75 | 7.75 |
|---|---|---|---|
| 7.75 | 7.75 | 7.75 | 7.75 |
| 7.75 | 7.75 | 7.75 | 7.75 |
| 7.75 | 7.75 | 7.75 | 7.75 |

=

Added together

| 7.75 | 8.5 | 7.75 | 8.5 |
|---|---|---|---|
| 8.25 | 8 | 8.25 | 8 |
| 7.75 | 8.5 | 7.75 | 8.5 |
| 8.25 | 8 | 8.25 | 8 |

>

Truncated value to be transmitted

| 7 | 8 | 7 | 8 |
|---|---|---|---|
| 8 | 8 | 8 | 8 |
| 7 | 8 | 7 | 8 |
| 8 | 8 | 8 | 8 |

Fig. 4d

| 60 | 5 | 41 | 6 | 11 | 49 | 56 | 27 |
|---|---|---|---|---|---|---|---|
| 58 | 4 | 30 | 30 | 21 | 63 | 33 | 59 |
| 58 | 16 | 44 | 39 | 10 | 46 | 57 | 7 |
| 6 | 0 | 9 | 17 | 32 | 4 | 2 | 18 |
| 18 | 28 | 34 | 10 | 37 | 8 | 47 | 12 |
| 44 | 1 | 14 | 17 | 53 | 0 | 25 | 11 |
| 9 | 37 | 29 | 45 | 22 | 25 | 38 | 0 |
| 5 | 31 | 30 | 19 | 2 | 34 | 4 | 36 |

Fig. 5

| 175 | 204 | 158 | 47  | 32  | 253 | 159 | 34  | 5   | 110 | 84  | 16  | 205 | 130 | 69  | 217 |
|-----|-----|-----|-----|-----|-----|-----|-----|-----|-----|-----|-----|-----|-----|-----|-----|
| 153 | 184 | 60  | 146 | 40  | 43  | 202 | 57  | 132 | 133 | 179 | 125 | 229 | 203 | 191 | 101 |
| 89  | 121 | 116 | 141 | 190 | 144 | 105 | 180 | 185 | 92  | 112 | 17  | 77  | 164 | 211 | 245 |
| 142 | 103 | 233 | 126 | 230 | 215 | 49  | 143 | 189 | 124 | 22  | 174 | 241 | 79  | 38  | 231 |
| 93  | 212 | 219 | 244 | 176 | 7   | 120 | 41  | 194 | 55  | 145 | 98  | 195 | 28  | 161 | 35  |
| 113 | 129 | 85  | 196 | 249 | 167 | 228 | 171 | 209 | 193 | 165 | 26  | 33  | 86  | 23  | 45  |
| 248 | 246 | 160 | 68  | 51  | 157 | 54  | 168 | 39  | 250 | 82  | 111 | 234 | 0   | 61  | 88  |
| 221 | 56  | 30  | 137 | 48  | 139 | 67  | 29  | 162 | 156 | 100 | 235 | 218 | 90  | 6   | 118 |
| 21  | 237 | 65  | 95  | 18  | 109 | 224 | 52  | 63  | 71  | 240 | 251 | 255 | 62  | 10  | 199 |
| 53  | 135 | 181 | 163 | 147 | 242 | 36  | 91  | 150 | 46  | 210 | 138 | 19  | 155 | 117 | 37  |
| 31  | 8   | 254 | 172 | 64  | 104 | 187 | 119 | 25  | 122 | 148 | 58  | 78  | 247 | 208 | 87  |
| 108 | 151 | 223 | 44  | 178 | 169 | 9   | 200 | 149 | 154 | 239 | 94  | 183 | 72  | 12  | 226 |
| 27  | 59  | 166 | 152 | 115 | 114 | 1   | 4   | 201 | 3   | 220 | 238 | 50  | 97  | 227 | 14  |
| 123 | 81  | 216 | 73  | 177 | 13  | 2   | 186 | 243 | 198 | 96  | 107 | 128 | 11  | 182 | 102 |
| 66  | 83  | 131 | 80  | 222 | 136 | 75  | 76  | 173 | 207 | 127 | 214 | 232 | 24  | 42  | 197 |
| 140 | 213 | 236 | 20  | 99  | 188 | 134 | 170 | 225 | 70  | 252 | 192 | 106 | 206 | 74  | 15  |

Fig. 6

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 0 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 0 | 0 | 1 | 0 | 1 | 1 | 1 | 1 | 1 | 1 |
| 1 | 1 | 1 | 1 | 1 | 1 | 0 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

Fig. 7

| 32 | 107 | 8 | 211 | 111 | 79 | 251 | 96 | 27 | 116 | 44 | 129 | 19 | 239 | 23 | 241 |
|---|---|---|---|---|---|---|---|---|---|---|---|---|---|---|---|
| 127 | 67 | 159 | 113 | 25 | 141 | 6 | 249 | 104 | 72 | 124 | 64 | 162 | 61 | 190 | 81 |
| 91 | 179 | 55 | 195 | 235 | 58 | 208 | 65 | 103 | 209 | 15 | 115 | 176 | 197 | 5 | 165 |
| 238 | 18 | 183 | 254 | 45 | 244 | 130 | 243 | 38 | 133 | 150 | 120 | 39 | 186 | 225 | 51 |
| 194 | 140 | 89 | 167 | 173 | 153 | 14 | 157 | 144 | 94 | 143 | 85 | 232 | 87 | 178 | 188 |
| 26 | 189 | 230 | 2 | 233 | 54 | 137 | 227 | 73 | 181 | 1 | 177 | 46 | 191 | 20 | 100 |
| 185 | 69 | 132 | 234 | 75 | 118 | 164 | 22 | 222 | 252 | 109 | 52 | 172 | 78 | 236 | 70 |
| 9 | 139 | 158 | 57 | 148 | 42 | 174 | 163 | 126 | 37 | 128 | 213 | 17 | 123 | 216 | 114 |
| 187 | 117 | 24 | 255 | 253 | 146 | 90 | 98 | 82 | 101 | 155 | 93 | 99 | 169 | 41 | 166 |
| 161 | 86 | 102 | 108 | 13 | 196 | 193 | 4 | 156 | 131 | 16 | 149 | 30 | 223 | 121 | 59 |
| 28 | 240 | 31 | 248 | 214 | 68 | 135 | 147 | 105 | 80 | 202 | 77 | 138 | 231 | 7 | 142 |
| 242 | 66 | 110 | 180 | 47 | 212 | 49 | 245 | 182 | 145 | 204 | 160 | 122 | 92 | 220 | 95 |
| 48 | 203 | 0 | 152 | 206 | 53 | 136 | 119 | 34 | 125 | 40 | 205 | 12 | 171 | 33 | 221 |
| 200 | 97 | 134 | 217 | 36 | 226 | 10 | 184 | 219 | 84 | 246 | 60 | 199 | 83 | 228 | 76 |
| 201 | 35 | 168 | 71 | 247 | 63 | 224 | 218 | 43 | 210 | 3 | 198 | 50 | 170 | 11 | 192 |
| 215 | 207 | 229 | 237 | 29 | 175 | 21 | 154 | 151 | 88 | 250 | 74 | 106 | 62 | 112 | 56 |

Fig. 8

| 251 | 14 | 79 | 214 | 104 | 223 | 165 | 240 | 148 | 131 | 119 | 13 | 199 | 105 | 103 | 176 |
|---|---|---|---|---|---|---|---|---|---|---|---|---|---|---|---|
| 177 | 136 | 56 | 187 | 106 | 186 | 193 | 167 | 123 | 20 | 254 | 68 | 175 | 237 | 163 | 207 |
| 43 | 219 | 54 | 8 | 253 | 34 | 69 | 21 | 220 | 138 | 93 | 84 | 48 | 2 | 149 | 110 |
| 64 | 126 | 218 | 100 | 86 | 191 | 51 | 216 | 107 | 95 | 27 | 234 | 85 | 121 | 206 | 42 |
| 239 | 129 | 19 | 232 | 139 | 23 | 242 | 96 | 144 | 243 | 132 | 112 | 58 | 247 | 62 | 45 |
| 37 | 92 | 166 | 172 | 212 | 77 | 82 | 11 | 75 | 33 | 99 | 7 | 198 | 87 | 17 | 164 |
| 83 | 52 | 224 | 3 | 151 | 30 | 91 | 118 | 208 | 157 | 229 | 63 | 142 | 145 | 89 | 210 |
| 201 | 179 | 122 | 137 | 202 | 55 | 250 | 155 | 18 | 158 | 76 | 29 | 217 | 40 | 246 | 44 |
| 5 | 255 | 41 | 226 | 168 | 152 | 94 | 53 | 128 | 228 | 61 | 252 | 140 | 205 | 117 | 192 |
| 47 | 90 | 134 | 160 | 15 | 174 | 197 | 4 | 196 | 133 | 200 | 65 | 12 | 170 | 38 | 111 |
| 31 | 114 | 203 | 125 | 238 | 57 | 184 | 244 | 98 | 116 | 32 | 222 | 135 | 241 | 156 | 230 |
| 88 | 46 | 9 | 188 | 150 | 109 | 213 | 154 | 36 | 235 | 169 | 78 | 39 | 183 | 80 | 67 |
| 190 | 161 | 248 | 97 | 70 | 6 | 182 | 66 | 204 | 171 | 173 | 211 | 143 | 195 | 101 | 0 |
| 162 | 185 | 141 | 35 | 180 | 124 | 147 | 249 | 22 | 130 | 225 | 10 | 245 | 28 | 115 | 236 |
| 181 | 26 | 231 | 102 | 233 | 146 | 120 | 113 | 215 | 59 | 159 | 60 | 178 | 209 | 153 | 81 |
| 72 | 71 | 108 | 74 | 16 | 73 | 189 | 1 | 49 | 227 | 50 | 194 | 127 | 25 | 221 | 24 |

Fig. 9

| 74 | 242 | 153 | 79 | 194 | 85 | 165 | 155 | 204 | 1 | 94 | 222 | 33 | 181 | 54 | 150 |
|---|---|---|---|---|---|---|---|---|---|---|---|---|---|---|---|
| 192 | 17 | 184 | 123 | 59 | 156 | 131 | 52 | 176 | 90 | 233 | 56 | 136 | 220 | 101 | 143 |
| 12 | 208 | 108 | 102 | 235 | 23 | 237 | 96 | 183 | 77 | 203 | 38 | 119 | 232 | 2 | 214 |
| 190 | 118 | 147 | 86 | 124 | 137 | 43 | 95 | 158 | 83 | 103 | 225 | 25 | 91 | 189 | 231 |
| 58 | 71 | 186 | 172 | 104 | 211 | 188 | 105 | 179 | 162 | 34 | 92 | 252 | 76 | 70 | 20 |
| 44 | 245 | 61 | 72 | 55 | 47 | 134 | 148 | 26 | 206 | 228 | 36 | 139 | 37 | 246 | 223 |
| 236 | 142 | 3 | 254 | 230 | 178 | 49 | 227 | 171 | 19 | 100 | 109 | 175 | 41 | 113 | 8 |
| 138 | 66 | 157 | 117 | 27 | 21 | 244 | 7 | 64 | 251 | 42 | 255 | 16 | 241 | 210 | 48 |
| 67 | 209 | 238 | 4 | 221 | 161 | 125 | 202 | 174 | 114 | 57 | 15 | 193 | 14 | 88 | 224 |
| 115 | 50 | 84 | 152 | 239 | 51 | 97 | 107 | 46 | 93 | 216 | 135 | 253 | 30 | 185 | 112 |
| 187 | 13 | 250 | 5 | 110 | 111 | 140 | 173 | 177 | 201 | 169 | 6 | 130 | 133 | 164 | 166 |
| 167 | 247 | 63 | 196 | 146 | 154 | 127 | 240 | 0 | 198 | 9 | 249 | 31 | 234 | 28 | 24 |
| 87 | 18 | 53 | 218 | 32 | 226 | 11 | 68 | 248 | 89 | 151 | 199 | 73 | 106 | 229 | 200 |
| 191 | 219 | 80 | 132 | 141 | 128 | 168 | 144 | 121 | 149 | 145 | 116 | 40 | 160 | 99 | 39 |
| 62 | 129 | 205 | 180 | 22 | 170 | 163 | 159 | 35 | 126 | 45 | 122 | 243 | 120 | 65 | 197 |
| 215 | 10 | 60 | 182 | 81 | 212 | 29 | 78 | 195 | 213 | 207 | 82 | 75 | 98 | 217 | 69 |

Fig. 14

| 126 | 97 | 63 | 21 | 169 | 30 | 230 | 179 | 220 | 56 | 227 | 34 | 93 | 236 | 19 | 199 |
|---|---|---|---|---|---|---|---|---|---|---|---|---|---|---|---|
| 124 | 57 | 250 | 120 | 217 | 165 | 102 | 28 | 64 | 92 | 105 | 112 | 96 | 100 | 86 | 241 |
| 99 | 139 | 22 | 106 | 32 | 103 | 45 | 254 | 177 | 222 | 104 | 142 | 248 | 38 | 209 | 1 |
| 141 | 164 | 213 | 46 | 242 | 148 | 194 | 6 | 161 | 27 | 75 | 190 | 10 | 183 | 218 | 200 |
| 232 | 76 | 89 | 198 | 83 | 91 | 178 | 71 | 49 | 245 | 156 | 95 | 224 | 43 | 70 | 60 |
| 206 | 7 | 202 | 111 | 16 | 73 | 131 | 238 | 195 | 68 | 12 | 193 | 51 | 188 | 252 | 25 |
| 192 | 243 | 39 | 185 | 247 | 182 | 151 | 13 | 62 | 119 | 229 | 129 | 82 | 14 | 181 | 65 |
| 134 | 47 | 153 | 114 | 24 | 137 | 135 | 72 | 246 | 147 | 145 | 117 | 166 | 226 | 50 | 216 |
| 4 | 223 | 130 | 197 | 136 | 170 | 214 | 90 | 205 | 2 | 122 | 37 | 155 | 158 | 88 | 154 |
| 121 | 187 | 20 | 74 | 244 | 9 | 159 | 125 | 41 | 184 | 228 | 152 | 109 | 23 | 160 | 225 |
| 85 | 150 | 234 | 44 | 133 | 201 | 215 | 40 | 253 | 149 | 35 | 98 | 110 | 204 | 61 | 18 |
| 116 | 15 | 128 | 138 | 221 | 26 | 115 | 210 | 11 | 58 | 208 | 59 | 239 | 55 | 157 | 255 |
| 42 | 235 | 173 | 94 | 118 | 132 | 53 | 212 | 140 | 189 | 231 | 8 | 207 | 123 | 3 | 162 |
| 174 | 79 | 36 | 80 | 127 | 249 | 67 | 87 | 101 | 52 | 171 | 163 | 81 | 144 | 233 | 54 |
| 33 | 219 | 107 | 237 | 5 | 176 | 31 | 196 | 240 | 143 | 17 | 251 | 29 | 69 | 186 | 172 |
| 175 | 108 | 113 | 191 | 167 | 168 | 78 | 180 | 0 | 211 | 84 | 146 | 77 | 203 | 66 | 48 |

Fig. 15

METHOD AND DEVICE TO ENHANCE IMAGE QUALITY IN DIGITAL VIDEO PROCESSING SYSTEMS USING DITHERING

FIELD OF THE INVENTION

The present invention relates to digital still image or moving image processing systems where dither is applied to a digital image signal.

BACKGROUND TO THE INVENTION

Whenever the bit depth of an image needs to be reduced in a digital system a technique called dithering can be used to represent the original high bit depth image by fewer bits. The idea behind this is that by introducing small modulations to the image signal, before the truncation operation, the image signal after truncation to a lower bit depth will have a correct average value in an area as small as possible and/or a period as small as possible. A widely used technique is offset pattern dithering which can be implemented with relatively simple circuitry and which has predictable and reliable results.

Typically the size of the offset dither pattern is 2×2 or 4×4 pixels and the optional periodic modulation of these patterns occurs over 2 or 4 frames. Larger patterns can introduce too noticeable image artifacts, such as disturbing patterns or interferences with image details. Slower periodical modulations can introduce too noticeable flickering of the image.

Dithering is useful in many cases. Some example scenarios will now be described:

consider that an image generator renders a high resolution image with 10-bit precision per colour. The bit depth might need to be reduced to 8-bits per colour to use a standard transmission channel or a standard interconnection such as Digital Visual Interface (DVI) to connect the image generator to a display device such as a flat screen monitor or a projector. Dithering will cause the average of the 8-bit per colour output to be equal to the 10-bits per colour input in each 2×2 area of the image. Periodic modulation of the truncation process can be optionally applied to trade off between small spatial artifacts and temporal flickering.

consider that an image is processed or rendered with high bit depth but needs to be stored in a memory with limited density or bandwidth. Amongst other techniques, dithering can be applied to maintain colour information as much as possible while meeting the density or bandwidth limitation.

Digital displays as well as analog displays driven by a digital to analog converter have a finite bit depth per colour, often 8, 10 or 12 bits per colour. In many cases the digital image processing prior to the display needs more processing accuracy. Dithering is applied to resolve as much colour detail as possible when displaying the image. This is currently performed on display technologies such as Liquid Crystal Display (LCD), Liquid Crystal on Silicon (LCOS) and Digital Light Processing (DLP) based displays and is applicable to many other technologies.

A practical example of a 2×2 dither pattern is illustrated in FIG. 1c. Consider an image is generated at 10-bits per colour and must be sent to a projector using an 8-bit DVI link. The image generator (IG) has 4 times more gradations for each colour than the link supports. That means a truncation of the 10-bit values must be made prior to transmission via the 8-bit DVI link, The link only accepts integer 8-bit values in a range from 0 (black) to 255 (white). The 10 generates integer values in a range from 0 (black) to 1023 (white) in integer steps. Ignoring the range above 1020, this is practically equivalent to an IG generating values in a range from 0 (black) to 255 (white) in quarter steps. Dithering is the process to truncate these quarter step 1G values to integer 8-bit values in such a way that a small area has the correct average value. Optionally the small area average accuracy can be improved by temporal dithering modulation.

When scanning a video image, a column and line counter is usually available to the processing. A simple pattern can be constructed elegantly with XOR (exclusive or) equations of some of the least significant bits of both counters. Optionally, the least significant bits of the frame counter can contribute to these equations.

A few typical sets of equations to generate such offset patterns are included here as examples. These offset values are then added to the video data prior to truncation. A first example of a commonly used 2-bit 2×2 spatially fixed dither pattern is shown in FIG. 1c. FIGS. 1a and 1b show how the pattern of FIG. 1c is obtained. The most significant bit P(1) is obtained by P(1)=column(0) XOR line(0) (FIG. 1a) and the least significant bit P(0) is obtained by P(0)=column(0) (FIG. 1b). FIG. 2e shows a 4-bit spatially fixed 4×4 pattern. The most significant bit P(3) is obtained by P(3)=column(0) XOR line(0) (FIG. 2a), the second most significant bit P(2) is obtained by P(2) column(0) (FIG. 2b), the second least significant bit P(1) is obtained by P(1) column(0) XOR column (1) XOR line(1) (FIG. 2c) and the least significant bit P(0) is obtained by P(0)=column(0) XOR line(1) (FIG. 2d).

A third example is derived from the previous one by extending the equations using the least significant bit of the frame counter to temporally modulate the pattern.

The equations above become:

$P(3)$=column(0)XOR line(0)XOR frame(0)

$P(2)$=column(0)XOR frame(0)

$P(1)$=column(0)XOR column(1)XOR line(1)XOR frame(0)

$P(0)$=column(0)COR line(1)XOR frame(0)

This set of equations generates a 4×4 spatial 4 bit spatial pattern as in FIG. 2e during the even frames and switches to a modulated version of the pattern as shown in FIG. 3 during the odd frames.

The pattern is temporally modulated in order to reduce the spatial visibility of the pattern but the disadvantage is potentially some slightly visible flickering when using such a temporally varying pattern as an offset to the video data prior to truncation. Therefore temporal modulation of the pattern is not always desirable.

The effect of such a commonly used offset pattern dithering on the video signal can be explained using the 2×2 pattern that was shown in FIG. 1c. Suppose video data is rendered at 10-bits per pixel per colour and is to be transmitted via an 8-bit DVI link. Imagine a dark sky before sunrise. The sky contains a subtle and continuous change in luminosity. In this case the rendered steps are a quarter of the quantization level to be applied to the signal prior to transmission. Imagine an area where one colour channel, say blue, fades from 7 to 8. The following values are rendered by the image generator: 7, 7.25, 7.5, 7.75 and 8. When truncating these values without dithering to integer values, the result becomes 7, 7, 7, 7 and 8. The subtle colour changes are clearly lost because of the truncation needed to quantize the signal to 8-bits per colour per pixel. When the repetitive 2×2 pattern in FIG. 1c is added to the video before the truncation operation, the result is different Each of the original video levels causes the output of the dither circuitry to vary spatially, as shown in FIGS. 4b-4d. When video=7 the output shows no modulation or pattern, as shown in FIG. 4a. When video=7.25 the constant input value in a certain area will appear as a modulated value on the output of the dither circuitry as illustrated in FIG. 4b. Each 2×2 pixel area in the array of truncated pixel values has the correct average value. When video=7.5 the constant input value is displayed as a checker pattern as illustrated in FIG. 4c. Notice again the correct average value of the truncated addition in the right column. This value is transmitted to the display device. When video=7.75 the result is seen in FIG. 4d.

Although the known dither patterns have the desired result on the average signal values of the video signal, the repetitive nature of the pattern has a discrete spectrum with high energy peaks, especially in the high frequencies. In some cases additional video processing is required after dithering has already been applied to the video signal. Some processing functions, such as digital filters or interpolations, can interfere with the dithering patterns and artifacts such as false contouring and/or banding can become clearly visible. The dithering process is often configured by a device manufacturer and is part of the internal processing of a device, such as an image generator, display or projector. Accordingly, it is not possible for a user to control the interference effects that occur in the image processing chain.

The known dither patterns used in image processing applications, especially where dithering which is applied immediately before bit depth reduction, are small patterns (e.g. 2×2 pixels or 4×4 pixels) as it has been considered that the pattern should have the effect of achieving an average value across as small an area as possible. A side effect of a small repetitive dither pattern is that the resulting spectrum is a discrete spectrum with high energy peaks, especially in the high frequencies.

SUMMARY OF THE INVENTION

A first aspect of the present invention seeks to provide good, preferably improve processing of an image signal, where dithering pattern is applied in a processing chain.

A second aspect of the present invention seeks to achieve a good, preferably an improved dithering process.

A first aspect of the invention provides a method of processing a digital image signal in a processing chain between an image generator and an image display, wherein a dither pattern is applied to the image signal at a point in the processing chain, the dithering signal having a first spectrum, the method comprising:

applying a noise pattern to the image signal in the processing chain, the noise pattern having a second spectrum which is configured such that the combination of the first spectrum and second spectrum results in a more continuous spectrum.

This aspect of the invention provides a way of lessening the potentially disturbing spectral peaks in the dither pattern used in the processing chain by adding a well designed and proper amount of entropy to the video signal. Another way of considering the effect of this aspect of the invention is that it "fills up" the gaps in the spectrum in between the existing spectral peaks of the dither pattern. The resulting spectrum is a coloured (advantageously blue) noise spectrum. The continuity of the energy distribution helps to ensure interference-free image processing on such a treated dithered signal.

This aspect of the invention helps to eliminate undesired artifacts by adding well controlled entropy to the dithered image. This removes the undesired properties of the dithered image that cause the interferences and replaces the peaked spectrum by a more desirable continuous spectrum. In most cases a pattern offset dithering technique causes discrete spectral peaks where the energy increases with the frequency. Such an energy peaks can be considered as a fraction of a continuous coloured noise spectrum. This can be cyan, blue or purple noise or any other "cold" colour. Often the peak energy is proportional to the frequency. In that case the discrete peaks can be considered as samples from a blue noise spectrum. A digital signal can be generated and added to the dithered image such that a blue noise spectrum is obtained. A coloured noise spectrum is generated which is complementary to the peaked dithering spectrum such that when the two signals are mixed a continuous coloured noise spectrum is obtained. This eliminates potential interferences with other digital signal processing.

It will be appreciated that the noise pattern will not have a spectrum which is perfectly continuous but will, itself comprise a set of peaks. However, the peaks of the noise pattern advantageously are more closely spaced and more numerous compared to the spectrum of the dither pattern. This helps to complete the gaps in the spectrum of the dither pattern. The spectrum of the noise pattern can be made more continuous as the size of the noise pattern is increased. Advantageously, the dither pattern is an A×B array of offset values which is tiled across the image and the noise pattern is an N×M array of offset values which is tiled across the image, where N×M>A×B.

The image signal can represent a digital still image or can comprise a frame of a video signal. In the case of a video signal, the noise pattern can be varied temporally. Temporal variation can be achieved by modulating a noise pattern over a plurality of frames of the video signal or by storing a set of different noise patterns which are sequentially applied to frames of the video signal.

Advantageously, a different noise pattern is used for each colour component of the image signal. The colour components can comprise, for example: YUV; Y, R-Y, B-Y; or RGB. The noise patterns can be made "different" by modulation of a single noise pattern, or by using a different stored pattern per colour component.

A particularly advantageous way of applying the noise pattern to the image signal is by storing the noise pattern as an array in a look-up table and accessing elements of the array as a function of the line and row number of the image signal.

The noise pattern can be applied before the dither pattern in the processing chain (pre-processing scenario) or after the dither pattern in the processing chain (post-processing scenario).

A second aspect of the invention provides a method of processing a digital image signal comprising applying a noise pattern to the image signal, the noise pattern comprising an array of offset values, wherein the noise pattern has the following properties:

the values are linearly distributed across a range of values, with each value in the range occurring a substantially equal number of times within the array;

similar values at extreme ends of the range of values are dispersed within the array;

a substantially Poisson-disk two-dimensional spectral energy distribution; and wherein the noise pattern also has at least one of the following further properties:

values are positioned in the array based on distance to similar values in neighbouring repetitions of the array;

a sum of any column of the array is substantially equal to a sum of any other column of the array and a sum of any line of the array is substantially equal to a sum of any other line of the array.

Using a noise pattern with these properties as a dither pattern in image processing has been found to result in a processed image signal with a more continuous spectrum. This helps to reduce undesirable artifacts when the processed signal is subsequently processed by other processing stages in an image processing chain. Advantageously, the noise pattern is applied before a colour bit depth reduction operation.

It will be appreciated that a small deviation from strict compliance with one or more of the listed properties will incur a small penalty in the quality of the resulting spectrum. As an example, consider the property of a linearly distributed range of values, with each value in the range occurring a substantially equal number of times. It will be apparent that it would be possible to use the same value twice (thereby not strictly meeting the requirement for a linearly distributed range of values), and to not use another value at all. As another example, consider the "magic square" property where the sum of each line or column is the same as any other line or column. A small deviation from the ideal sum in one or more of the rows or columns is not likely to have a visible effect on the image signal. Accordingly, small deviations are intended to fall within the scope of protection of the claims, and especially deviations which do not make a visible effect on the image signal.

Further aspects of the invention provide methods for generating noise patterns for use in the above methods.

The functionality described here can be implemented in software, hardware or a combination of these. The invention can be implemented by means of hardware comprising several distinct elements, and by means of a suitably programmed computer. Accordingly, a further aspect of the invention provides a digital image or video processing device comprising a module for applying a noise pattern to a digital image or video signal. A still further aspect of the invention provides software for performing any of the described methods. The software may be tangibly embodied on an electronic memory device, hard disk, optical disk or other machine-readable storage medium, The software may be delivered as a computer program product on a machine-readable carrier or it may be downloaded to a processing device via a network connection.

Throughout the following description of the invention, the term "image signal" applies to a signal representing a still image or a signal representing video.

BRIEF DESCRIPTION OF THE DRAWINGS

Embodiments of the invention will be described, by way of example only, with reference to the accompanying drawings in which:

FIGS. 1a-1c show a known 2×2 offset dither pattern that can be applied to an image signal;

FIGS. 2a-2e show a known 4×4 offset dither pattern that can be applied to an image signal;

FIG. 3 shows a modulated form of the offset dither pattern of FIG. 2e which can be used for temporal modulation of an image signal;

FIGS. 4a-4d show the effect of a 2×2 offset dither pattern on video data;

FIG. 5 shows an 8×8 array of values for producing white noise which has been generated without constraints;

FIG. 6 shows a 16×16 array of values for producing white noise which has been generated with a linear distribution constraint;

FIG. 7 shows a result of using the noise pattern of FIG. 6 on video data, and undesired graininess;

FIG. 8 shows a 16×16 array of values for producing blue noise;

FIG. 9 shows an improved 16×16 array of values for producing blue noise which has been generated with a constraint which places high and low values before middle values;

FIG. 14 shows a 16×16 array of values resulting from an additive synthesis process;

FIG. 15 shows a further 16×16 array of values resulting from an additive synthesis process with additional constraints compared to FIG. 14;

DESCRIPTION OF ILLUSTRATIVE EMBODIMENTS

Figure 10:
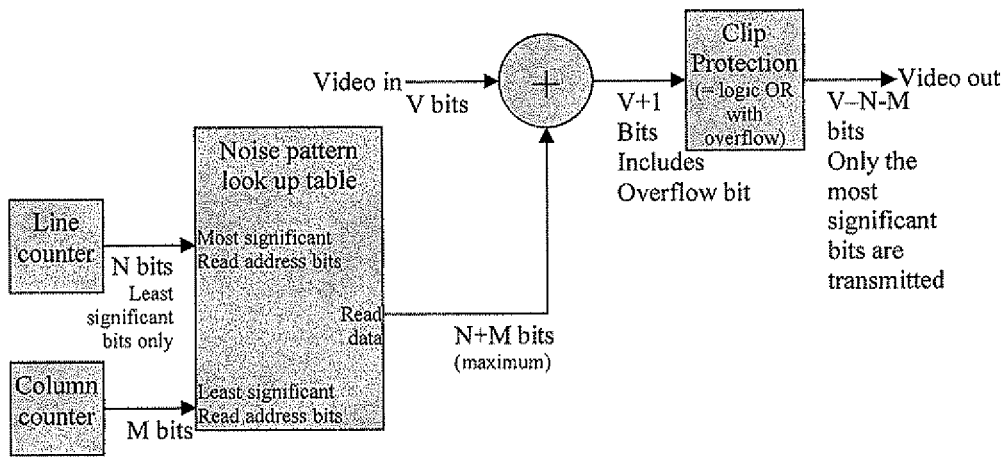
FIG. 10 schematically shows apparatus for applying the noise pattern to an image signal using a look-up table and line and column counters.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

White Noise Generation

A computer program can calculate any coloured noise signal. The easiest type of noise to create is white noise. Two dimensional white noise with a certain bit depth can be generated by producing a sequence of standard floating point random numbers then truncating the results according to the desired bit depth and storing them in a two dimensional array. This produces white noise without any constraints.

In case 16-bit white noise is desired a 256×256 array can be used to store the integer numbers in a range from 0 to 65535. To generate 8-bit white noise a 16×16 array is suitable to store the integer numbers in a range from 0 to 255. When no constraints are applied it is likely that some numbers will appear twice or more in the array and consequently it is also likely that some numbers will not appear at all and this will cause an undesired non-linear behaviour of the entire truncation process. This is illustrated in FIG. 5 for a 6-bit array of 8×8 pixels.

As can be seen the value zero occurs 3 times, value 1 only once and value 3 for instance is missing. This noise pattern could be used to reduce video data from 16-bit to 10-bit. However, equally spread 16-bit increments of the dithering input data will cause different steps at the 10-bit output. Some steps will be magnified by a factor of three or even more as some values appear at least three times in the array in FIG. 5, while other inputs steps will not cause any changes to the output of the dither circuit. This is a much undesired non-linear behaviour that can easily be solved by adding a constraint when the numbers are generated. Each time a random value is generated one can verify whether or not the value was generated before. In that case a new random number is generated until the result is a new unique value. In this example the final result will be an 8×8 array with all unique values in an integer range from 0 to 63.

Another approach is by inserting all numbers from 0 to 63 sequentially at random positions in the 8×8 array. When a position is occupied by a previous number a new random position is generated until a previously unused position in the array is found. Then the value is stored at this position. In this way the final result is again an 8×8 array with all unique values in the integer range from 0 to 63.

The BASIC program in Annex A illustrates a possible implementation of the above described process for an 8-bit white noise pattern. The result is a two dimensional array (pattern) that contains the full range of 8-bit integer numbers. The spectrum generated with this process is white.

Although this dither method has a lot of interesting properties such as a linear behaviour and a continuous spectrum which avoids potential interferences it causes the images to appear "grainy". This can be indicated using FIG. 6 which shows a result of the program explained above.

Suppose a video value of 251 is added to the noise pattern shown in FIG. 6. When the result is divided by 256 and then truncated most of the pixels will have a value of 1, but some will be truncated to 0. A value of $251/256^{th}$ is converted by the dither process to 251/256 of the pixels having a value of 1 and 5/256 of the pixels having a value of 0. This way the correct average value is obtained in each 16×16 pixel array. The result is shown in FIG. 8.

As can be seen in FIG. 7, a video level of 251 introduces small clusters of black dots. This explains the grainy appearance of images dithered with white noise. These clusters represent low frequency energy present in the spectrum.

Blue Noise Generation

To avoid the image graininess typical for white noise based dithering more constraints can be added to the above mentioned method. These extra constraints will colour the noise pattern. While scanning all values, constraining the minimum distance between the location of the previously scanned values and the current value to be placed in the array is a simple approach to create a bluish noise spectrum.

The BASIC program in Annex B illustrates a possible implementation of the above described process for a first order approach of an 8-bit blue noise pattern. The program scans all values in a range from 0 to 255 and places them in the blue noise pattern array. As the array gets more and more filled up the minimum distance constraint needs to be adapted. This is done by tracking the maximum possible distance from any previously placed value per array location. For each element the distance to the nearest used location (DTNUL parameter in the program) is tracked. The maximum of the DTNUL values in the entire array is the largest distance to any used location (LDTAUL parameter in the program). This LDTAUL parameter is refreshed each time a value has been placed in the array.

Each time a random location is generated the DTNUL value is compared to the LDTAUL value for that location. In order for the new random location to be valid for the current noise value the DTNUL value must be above a parameterized fraction of the LDTAUL value. This threshold parameter has a useful range between 0 and 1. The threshold value has an influence on the noise colour. Very high values close to I will bound the randomness of the generated array and this will produce patterns similar to the example in FIG. 3 and thus an undesirable high frequency peaked spectrum. Very low values close to 0 will not constrain the randomness of the generated array and thus will produce white noise patterns similar to the example in FIG. 7 which causes an undesirable graininess of the image. As the threshold value has a major impact on the obtained noise spectrum its value has to be carefully chosen or calculated. Some threshold values produce interesting properties. Some examples are the golden ratio number (0.618) and the square root of a half (0.707) and more advanced calculations have been found to yield numbers in a range typically between 0.6 and 0.9.

For each array element (x,y) the distance to the current location (xc,yc) is calculated by the program after each new valid placement of a noise value in the current location xc,yc. The distance is calculated as:

$$distance = \text{Sqrt}((x-xc)^2 + (y-yc)^2),$$

However, as the pattern repetitivity has to be taken into account the so called pan distance needs to be calculated. The pan distance between location A and B in the array is the smallest distance that can be found between all As and Bs when the pattern is repeated in 2 dimensions. For example, in a 64×64 array the distance between A in the left top location and B in the right bottom location=squareroot $(63^2+63^2)$. However, the pan distance is only squareroot (1+1) as the A location of the repeated pattern (found in the next column and row of patterns) is very close to the B location in the current pattern. The pan distance between A and B effectively is the minimum distance between all As and all Bs in the entire image, The pan distance ensures that occupied locations near the edges of the array are contributing to the constraints of the noise values placement in the neighboring arrays. These neighboring arrays are an exact duplicate of the current array being calculated because of the pattern repetition.

The pattern above shows well distributed low values, but the higher values indicate some clusters. Values 253 and 255 are located near each other causing undesired graininess again. The algorithm spreads low values very well but as the array gets filled up there is no room left for the higher values to be spread out as desired. This can be solved by alternately placing a low noise value and a high noise value in the array. Such a sequence can be 0, 255, 1, 254, 2 . . . 27 and 128. The spectral energy distribution is mainly determined by these first extreme values.

The distance to the nearest used location must now be tracked for the low and high values separately. This adds an extra dimension to the DINUL array which now becomes three-dimensional. The largest distance to any used location must also be tracked for low and high noise values separately.

Therefore the LDTAUL also becomes an array. A possible implementation of such an algorithm is illustrated in the BASIC program below.

Figure 12:
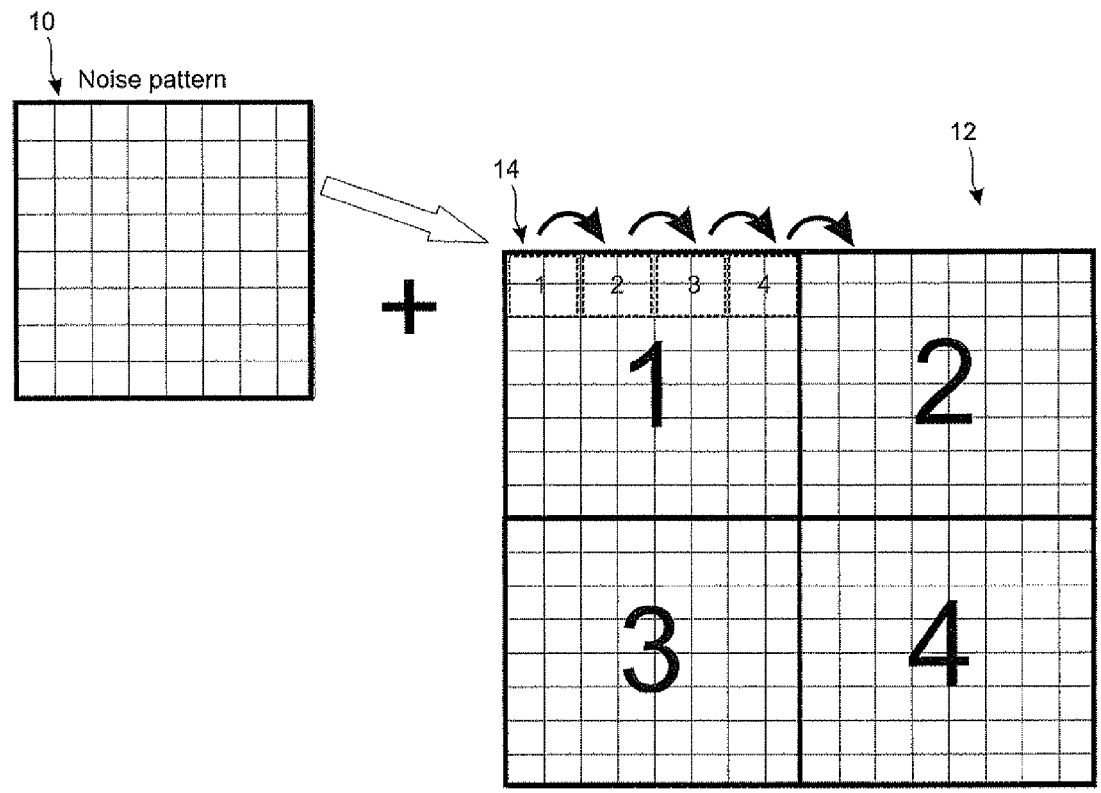
FIG. 12 shows tiling of a noise pattern and another noise (dither) pattern across an image.

The BASIC program in Annex C generates a blue noise pattern with no clusters in low values or in the high values. Naturally, clusters with numbers near the centre value (127.5 in case of an 8-bit noise pattern) can occur but as these represent almost no modulation energy these clusters hardly contribute to the undesired low frequencies in the spectrum. A typical output of the described algorithm is shown in FIG. 12 for a 16×16 pixel pattern. The pattern in FIG. 9 can be mixed with image or video data almost without introducing interferences. The larger the pattern is chosen the more continuous the spectrum can be made and thus the better interferences can be avoided. Larger patterns will require more memory for storage and thus hardware implementations require more resources.

Preferred Embodiment for Coloured Noise Dithering

FIG. 10 shows an embodiment of an image/video processing chain in which a noise pattern is applied to an image/video signal. A repetitive pattern is desirable for a real time processing hardware implementation as it reduces the required hardware resources. The noise pattern is stored in a look-up table. In hardware implementations the memory density required to store the pattern depends on the size of the pattern. In the case of a 64×64 pattern each noise bit requires 4 Kbit of embedded RAM. For an N-bit noise pattern, the total memory requirement is 4K×N=N Kbit of memory. The look-up table is accessed by forming a read address based on the line and column of the image. As the line counter and column counter are incremented to scan the pixels of the image, a read address is formed and an element of the look-up table corresponding to that read address is read out. Data from the look-up table is added to data bits of the image signal. The scheme shown in FIG. 10, where a read address is formed using N least significant bits of the line counter and M bits of the column counter is an example. Many other schemes are possible.

Figure 11:
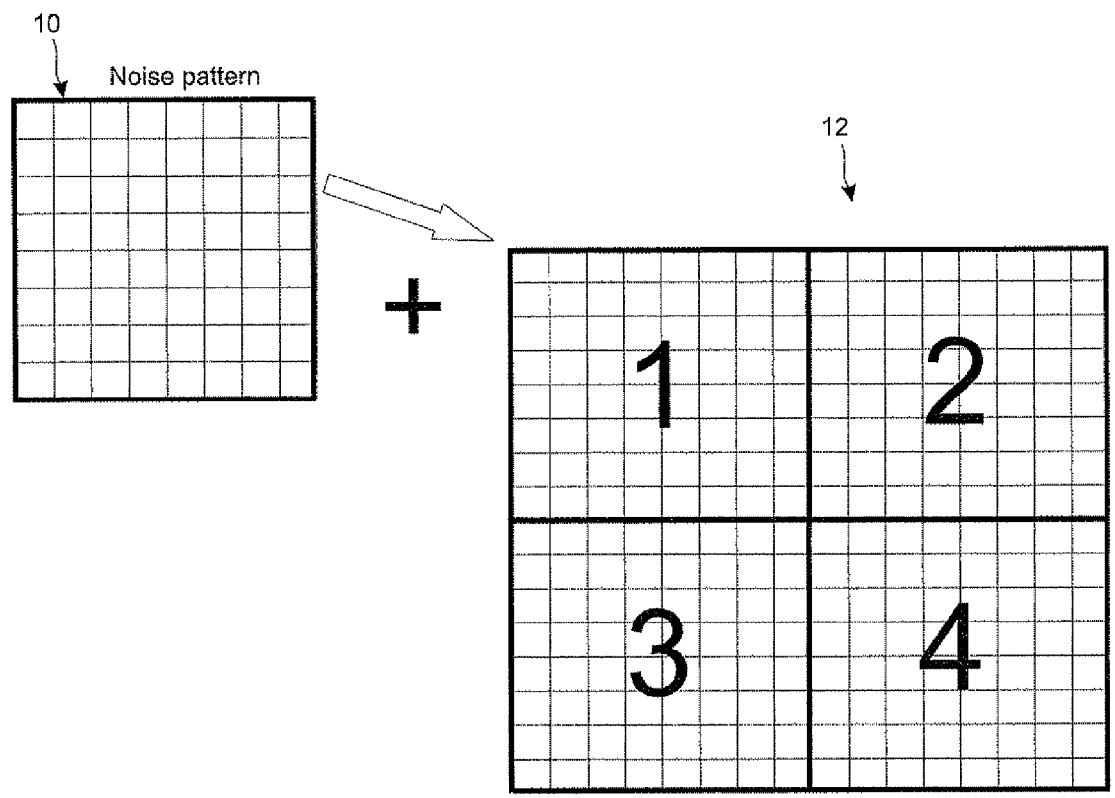
FIG. 11 shows tiling of the noise pattern across an image.

FIG. 11 illustrates the process of tiling the noise pattern 10 across the image 12. In this example the image is 16 pixels×16 pixels and the noise pattern is an 8×8 array of values. The same noise pattern 10 is tiled across the image in locations 1, 2, 3, 4. At each location, an element of the noise pattern is added to a pixel value. This is repeated for every noise pattern element/pixel pair. FIG. 10 shows that the tiling can be implemented by a look-up table based on column and row counter values.

In the examples so far the pattern has been illustrated as a square. Although an N×N square array containing $N^2$ unique values is particularly advantageous, a rectangular N×M array containing N×M different values can also be used. For example, a 128×64 pattern would provide good results. As explained earlier, it is desirable to equally distribute the noise values to obtain a linear quantization. All possible values within the desired range should appear. Therefore the maximum noise data width that can be read from the M×N noise pattern look-up table is M+N bits. In the case of a 64×64 pattern the maximum noise pattern precision is 12 bit.

When the noise pattern is added to the video data with a precision of V bits, it is possible to obtain a result larger than the highest number representable by V bits. In this case the adder (indicated by the + sign in FIG. 10) generates a so-called overflow bit. The clip protection block in FIG. 10 performs a logic OR function to maintain a white output when the well controlled noise signal as proposed by the current invention is added to a white input. Without this clip protection adding noise to a white input would introduce highly undesirable black speckles.

FIG. 12 shows an advantageous relationship between the size of the noise pattern 10 and a dither pattern 14 which may also be tiled across the image at some point in the image processing chain. It is desirable that the noise pattern 10 has a larger number of elements compared with the noise pattern as the larger number of elements can help to provide a more continuous spectrum.

Figure 13:
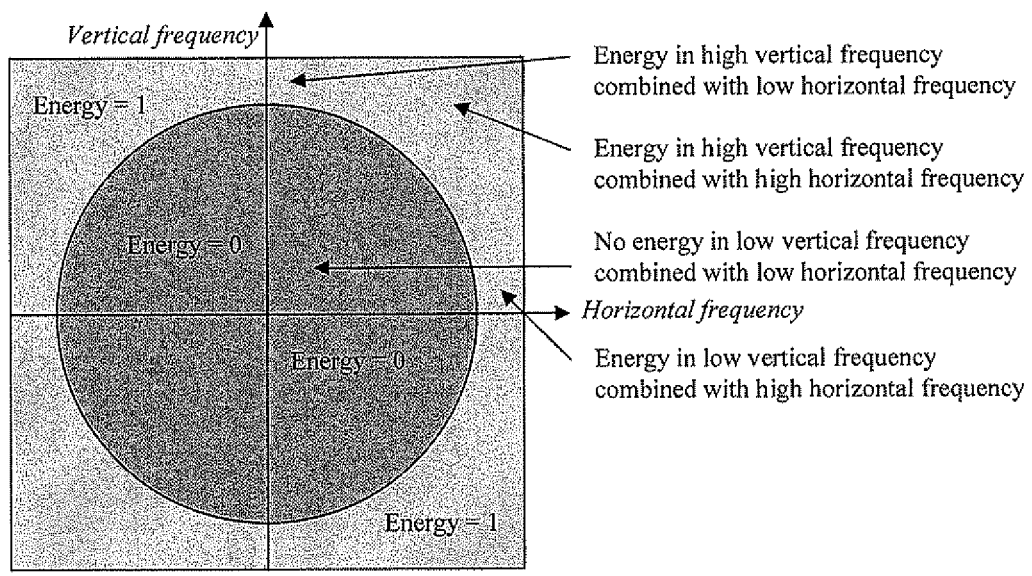
FIG. 13 shows a desired two-dimensional spectrum of the noise pattern approximating a Poisson disk.

The algorithm described in Annex C generates a continuous blue noise spectrum. The two-dimensional spectrum approximates a so-called Poisson-disk distribution as illustrated in FIG. 13. Due to the constraints applied to the distances between successive noise values during the placement algorithm any graininess in the image is avoided. In two dimensional spectral terms this means that there is no energy present in the frequency coordinates within a certain radius near the centre. The centre represents the point without any oscillations in both directions.

The Poisson-disk energy distribution indicates that all energies are distributed equally over high frequencies in any dimension. In each of the two dimensions the amount of energy present in the noise signal increases with the frequency as more frequencies in the other dimension deliver a contribution to the total energy.

The Poisson-disk distribution is known as the best sample pattern to avoid any interference with image data. This is not only based on mathematical properties as discussed above but is also based on the evidence that can be found in our own eyes. The Poisson-disk distribution is found among the sparse retinal cells outside the foveal region in the human eye. Although the human brain intensively processes the captured image causing some remarkable artifacts of totally different types the pattern of these photo receptors never causes any noticeable interference or aliasing with details or repetitive patterns images you can see.

Controlling the Coloured Noise Spectrum

Another approach to generate a Poisson-disk distributed noise pattern is by additively synthesizing the spectrum. Each two dimensional frequency can be calculated with its own independent two-dimensional phase and amplitude. This is illustrated by the BASIC program in Annex D for a 16×16 pattern. In this example all discrete spatial frequencies that can occur in a 16×16 pattern are calculated for each element in the 16×16 array as floating point numbers. The two dimensional spatial frequencies above a specified Poisson radius parameter multiplied by the highest possible frequency are calculated with random two-dimensional phase (px, py) and constant unity amplitude (ax,ay).

For a 16×16 pixel pattern the range of the oscillation period is from 2 to 16 pixels. The longest period available is 8 times the shortest period which is considered as the spectral unity in the program. The program synthesizes 8×8 frequencies. It does not compute any frequency components equal to zero. This is to avoid certain columns or lines to be brighter in average than others. In order two have equal average brightness of all columns and lines the average noise value added per column or per line should be equal. This is similar to constructing a magic square. If the pattern does not contain spectral frequencies located on the x and y axis in the two-dimensional Fourier transform this condition is best fulfilled. In general, approaching magic square properties as much as possible is desirable as these properties contribute well to the noise signal entropy. These magic properties will be explained in more detail further on.

Special attention is required for the highest available frequency in each dimension. As a pixel on-pixel off pattern is not attenuated by a resampling process a correction is needed to accommodate for the differences with other frequencies.

The best correction value to use is the golden ratio as illustrated in the program and can be determined using statistical equations.

The BASIC program in Annex D outputs a 16×16 pattern with unequally spread floating point numbers. In order to convert the obtained values to an integer range from 0 to 255 an additional function must be performed to obtain the desired range of integer numbers. Obviously such an operation is equivalent to a non-linear quantization and will alter the obtained spectrum. As a result the integer pattern will have a less perfect Poisson-disk distribution. It is however a good starting point for further computations as will be explained later.

Annex E illustrates how a series of unequally distributed floating point numbers can be converted to an equally spread integer range of numbers. Annex E scans the desired 8-bit integers from 0 to 255 and locates the floating point values from minimum to maximum value. Due to the large negative offset value the floating point values were initialized early in the program in Annex D it is possible to replace the minimum value by the currently scanned integer value while the unprocessed values maintain negative numbers.

The floating points generated by the program in Annex D are all large negative numbers while the program in Annex E outputs positive integer numbers. This way only one array is required to perform the number format conversion as can be seen in Annex E. Once the minimum negative floating point value is replaced by 0 the second largest negative number becomes the minimum value and will be replaced by 1. This process continues until all 256 values are replaced by integers.

Despite the well approximated Poisson-disk distribution of the spectrum the algorithm illustrated in Annexes D and E does not evenly diffuse the peak values properly as is the case with the algorithm illustrated in Annex C.

A typical example of the result generated by the program illustrated in Annexes D and E is shown in FIG. 14. This shows that the peak values are not evenly diffused among the noise pattern. Although this does not necessarily introduce interference artifacts it is less desirable as the nearly clustering lowest peak values indicated in the Figure potentially cause graininess in the image.

It is possible to combine the advantages of both methods that were illustrated in FIGS. 9 and 14. Although the algorithm used to construct the noise pattern in FIG. 9 has a threshold parameter to control the noise colour it does not allow to precisely control the spectrum. It does however produce a noise pattern that has many desirable properties as described earlier. On the other hand the algorithm used to construct the noise pattern in FIG. 14 has a much more controllable spectrum as it performs additive synthesis where each of the two-dimensional frequency components which compose the coloured noise spectrum has controllable amplitude. Although these amplitudes are slightly altered by the non-linear conversion process from the original floating point values to the desired uniformly spread integer range the final energy distribution in the spectrum very well approximates the targeted spectrum.

The algorithm illustrated for a 16×16 pattern in Annex C uses a threshold parameter to constraint the random placement of successive noise values. After the location for value 0 is determined a minimum distance constraint is applied for the placement of value 1. When a new random position is calculated the minimum is distance constraint is tested and based on this comparison the new location is accepted or rejected. Similarly, an algorithm can look-up the location of value 0 in a synthesized coloured noise pattern as illustrated in FIG. 14 for a 16×16 pattern. Then the same minimum distance constraint as mentioned above can be used to determine the best possible position for value 1.

The minimum distance constraint is tested for all free locations in the array and based on this comparison the new location is marked as a valid or invalid location for the value 1. Then the minimum value of all locations marked as valid is located in the array as illustrated in FIG. 14. This process is repeated for all values up to 127 in the example of a 16×16 pattern.

The same process is repeated for the upper values starting by locating the location of value 255 and determining the best position in the array for value 254 based on the same minimum distance constraint determined by the threshold parameter. In this 16×16 pattern example the last value that will be placed into position is 128. A typical result of the above described algorithm can be found in FIG. 15. Although the spectrum is very similar to the spectrum of the pattern obtained by non-linearly quantized additive synthesis as illustrated in FIG. 14 the peak values are much better diffused among the pattern.

The BASIC program in Annex F illustrates the above described technique to generate a Poisson-disk distributed spectrum with uniformly diffused pattern peak values to avoid graininess in the image. The program performs additional computations to the noise pattern generated by the program in Annex E. The program first offsets the lower 128 and higher 128 values separately to simplify the additional computations needed to find the optimal location for each value in the array as explained. Then the program continues by scanning the first half of the desired integer value range by taking into account the minimum distance threshold parameter based on the additively synthesized coloured noise spectrum. Before scanning the upper half of the integer range the program reinitializes the DTNUL and LDTAUL values as the spacing between high values is independent from the distribution of low values.

Figure 16:
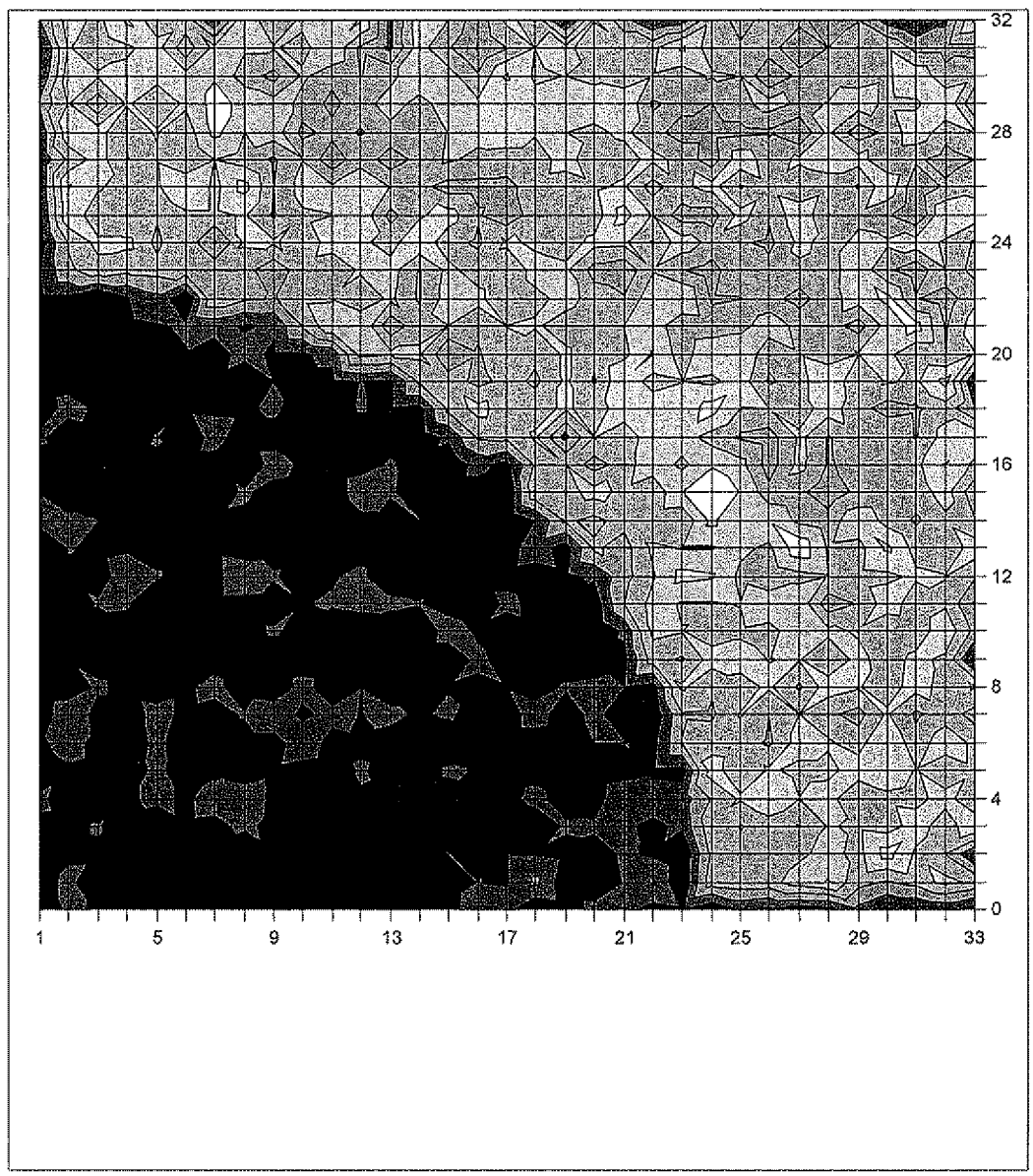
FIG. 16 shows a two-dimensional spectrum resulting from an array which has been generated using an additive synthesis process.

The result of the program in Annex F is an equally distributed noise pattern with a spectrum close to the optimal Poisson-disk distribution. A typical example of the obtained spectrum by this algorithm is show FIG. 16. As the spectrum is symmetrical around the two frequency axis the Figure only shows its positive quadrant. In this example a 64×64 coloured noise pattern was calculated with 12 bit integer values using the algorithms described in Figures D, E and F.

The spectrum shows the entire range of frequencies a repetitive 64×64 pattern can contain with periods from 2 pixels to 64 pixels. It also includes the frequencies on the axis equal to zero. Therefore 33×33 frequencies are calculated for a 64×64 coloured noise pattern. As clearly visible by the quarter circle the spectrum accurately approximates the Poisson-disk distribution.

A possible practical implementation is already shown in FIG. 10. Consider an image generator renders an image with 20 bit per colour accuracy. After adding the 64×64 coloured noise pattern with a spectrum as displayed in FIG. 20 the video data can be truncated to 8-bit per colour. This 8-bit signal represents the original 20 bit signal practically without introducing any interference or other undesired artifacts. The size of the look-up table can be easily calculated. 64×64 pixels require 4096 or 4K addresses. The data bus is 12-bits wide. The total memory resources required are only 4K×12 bit=48 Kbit of memory. In today's FPGA devices with several megabits of embedded memory this dither circuit requires only a fraction of the available device resources. It will be appreciated that the processing described in this invention can be performed by Digital Signal Processing (DSP) chips or other integrated circuits, a hardware implementation using discrete devices or a processor executing software.

So far only one colour has been considered. There are a few possibilities to process multiple colour spaces such as: YUV; Y, R-Y, B-Y; or RGB. One simple approach is to invert the noise pattern values before adding them to the green video channel. When the red and blue channels receive the non-inverted noise pattern the luminance fluctuations can be minimized. Another possibility is to generate a separate noise pattern per colour. The optimal combination for noise patterns per colour component depends on the colour space used.

Temporal modulation can be applied to the spatial coloured noise pattern to minimize its visibility. The pattern can be extended to a three-dimensional look-up table, although it will be appreciated that this has a penalty of requiring more resources to implement the circuit. A more efficient approach is to modulate some aspects of the pattern based on the frame counter. Some operations can be applied to the coloured noise pattern while entirely preserving its interesting spectral properties. These operations include shifting or translating the pattern in both spatial dimensions, rotating the pattern, mirroring the pattern in both spatial dimensions and inverting the values.

Figure 18:
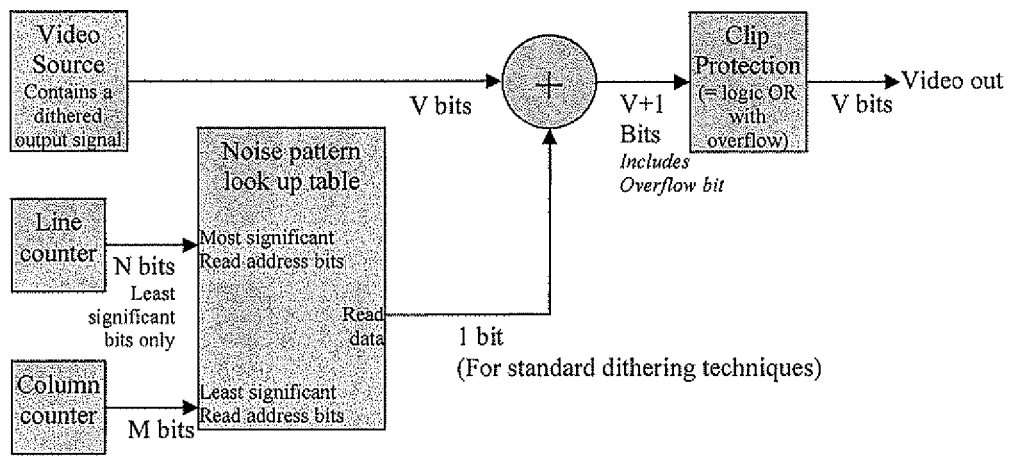
FIG. 18 schematically shows post-processing an image signal, to which dither has already been applied, with the new noise pattern.
Figure 19:
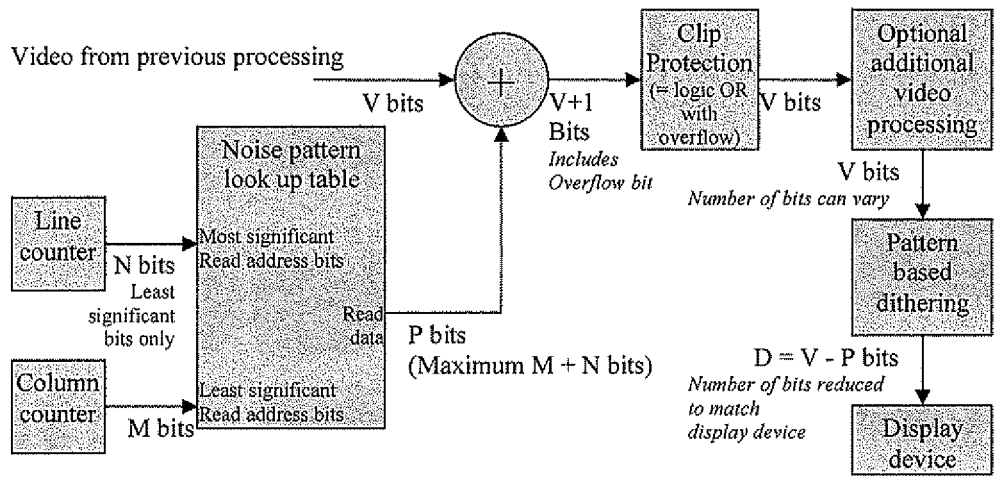
FIG. 19 schematically shows pre-processing an image signal with the new noise pattern before another dither pattern is applied to the image signal.

Shifting the pattern dynamically in horizontal dimension can be achieved by applying a XOR function with any of the least significant frame counter bits to the most significant column counter bit applied to the look-up table in FIGS. 10, 18 and 19. Similarly shifting the pattern dynamically in vertical dimension can be done by applying a XOR function with any of the least significant frame counter bits to the most significant line counter bit applied to this look-up table. By dynamically inverting the most significant column counter bit the noise pattern is shifted horizontally by half its width. This is equivalent to adding half the width to the column counter. Dynamically inverting the most significant line counter bit shifts the noise pattern vertically by half its height. This is equivalent to adding half the height to the line counter. The XOR implementation is not only more efficient compared to a full adder but also adds a desirable amount of shifting by half the width and/or height. Rotating the pattern dynamically can be based on swapping the column and line counter as function of a certain frame counter bit.

Mirroring the pattern dynamically in horizontal dimension is performed by a XOR function with any of the least significant frame counter bits on all column counter bits applied to the look-up table simultaneously. Similarly mirroring the pattern dynamically in vertical dimension is performed by a XOR function with any of the least significant frame counter bits on all line counter bits applied to the look-up table simultaneously.

Although the temporal modulation possibilities are not restricted to the examples mentioned above the mentioned examples are amongst the most efficient and most qualitative methods for temporal modulation of a noise offset pattern.

Matching the Coloured Noise Spectrum to the Offset Dither Pattern

The noise patterns described so far can be applied to an image or video signal as an optimised form of dither, to provide better results compared with conventional small patterns. It is also possible to use the noise patterns described previously even where another device in the processing path performs a dithering operation. By matching the spectrum of the noise pattern to complement the spectrum of the other dither patterns, such as those described in FIGS. 1, 2 and 3, it is possible to achieve a more continuous overall spectrum which is better suited to other image processing operations that may occur in the processing chain. An additional computation stage is required to reduce the local energy in the synthesized spectrum using the algorithm as illustrated in Annex F. The program in Annex G applies these extra constraints to the synthesized spectrum.

Considering again the dithering pattern shown in FIG. 2e, the spectrum corresponding to this pattern has 4 energy peaks. Their two-dimensional spectral positions and magnitudes can be calculated using the 2D Fourier transform:

Peak(1): Energy=1, Fx=1, Fy=1
Peak(2) Energy=0.5, Fx=1, Fy=0
Peak(3): Energy=0.125, Fx=0.5, Fy=0.5
Peak(4) Energy=0.088, Fx=1, Fy=0.5

Where Fx and Fy are the spatial frequencies relative to the Nyquist frequency.

Figure 17:
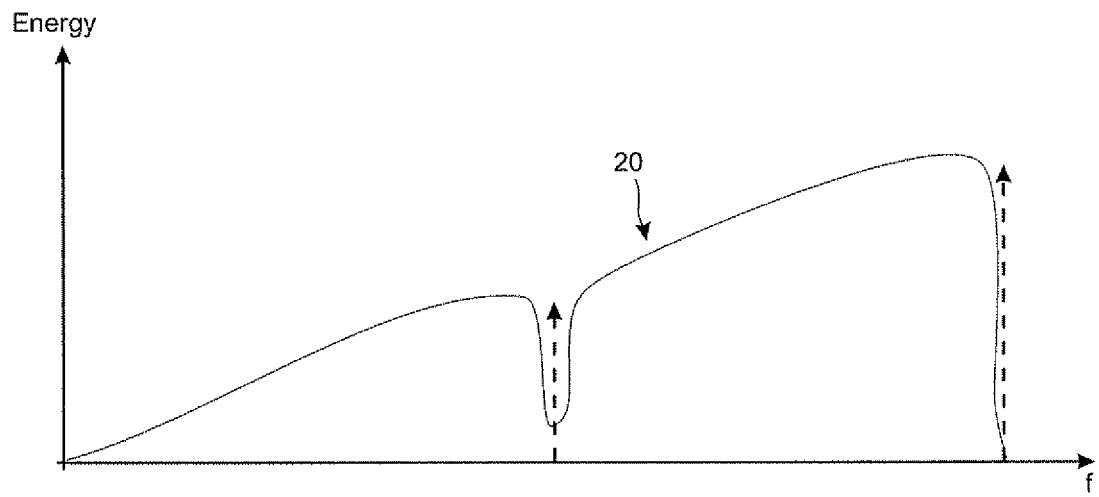
FIG. 17 shows a 1D spectrum to illustrate the process of configuring the spectrum of the noise pattern to complement the spectrum of another dither pattern.
Figure 17:
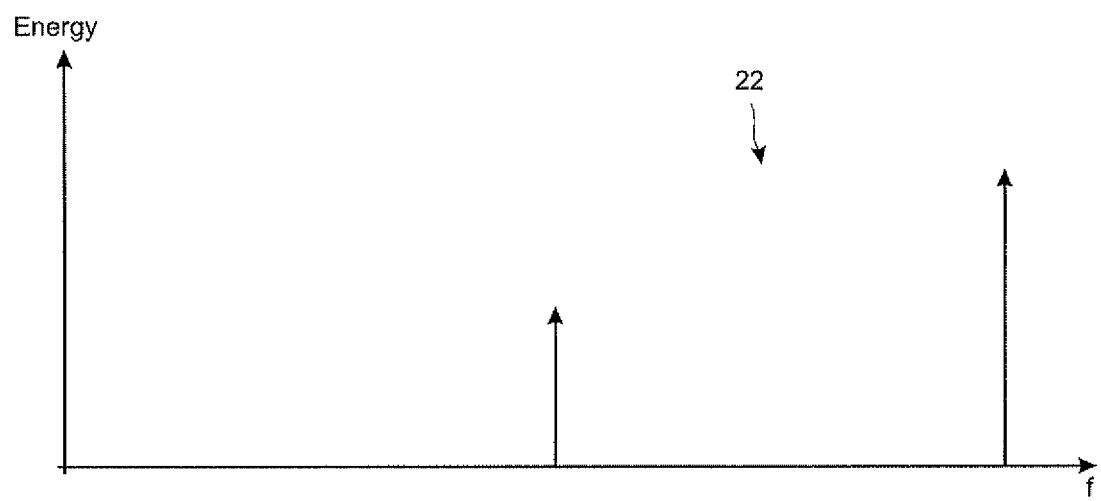

These frequencies are excluded, or suppressed, completely by the program in Annex G to obtain a smooth continuous mixed spectrum. The optimised coloured (blue) noise pattern generated with the combination of the algorithms described in Annexes F and G avoids potential interference caused by an earlier or later applied dither technique in the processing chain. FIG. 17 illustrates the effect of the matching process using a 1D frequency plot. Although the noise pattern is configured for 2D frequency, the plot of FIG. 17 helps to more clearly illustrate the principle of the matching process. The existing dither process has a peaked spectrum 22. Spectrum 22 can have more peaks than are shown here, with locations defined in the 2D frequency domain. The spectrum 20 of the noise pattern is configured with minima at frequencies corresponding to frequencies at which the peaks in spectrum 22 occur. FIG. 17 shows a blue noise spectrum which increases with frequency.

The noise pattern can be applied to an image signal before another dithering process (the pre-processing scenario) or it can be applied to the image signal after another dithering process has been applied to the signal (the post-processing scenario).

The post-processing scenario is illustrated in FIG. 18. Conventional dither techniques mix the image or video data with a noise pattern causing the video output to alternate between 2 successive values. This means that the final noise pattern amplitude that appears on the output video data must be considered as equal to the quantizing error. In order to fill up the energy gaps between the spectral peaks caused by such a dither technique it is therefore sufficient to add a matched coloured noise pattern with 1 bit amplitude per colour. The array of values stored in the look-up table of FIG. 18 is exactly as described previously, except that there is only a need to use the most significant bit of each entry in the array. Indeed, it is possible to reduce the contents of the LUT and store just the MSB bit of each value.

The video out signal in FIG. 18 can be subjected to various kinds of digital image processing, including filtering and interpolations without the risk of introducing artifacts caused by interference with the dither pattern present in the video input signal.

The pre-processing scenario is illustrated in FIG. 19. An image or video stream is pre-processed to help eliminate interference artifacts introduced by the pattern based dithering further on in the processing path. A well-controlled coloured noise signal, as described earlier, is added to the video data. Advantageously, the noise amplitude and thus the amount of noise bits added to the video data matches the amount of bits reduced by the pattern based dithering. In many cases the pattern based dithering is performed by a display driver chip. A practical example clarifies this method.

Suppose a display device can handle 10-bit video data per colour. Imagine a 14 bit video processing block sends a 14 bit data stream per colour to a display driver chip performing built in dithering to 10-bit. In this case the current invention adds a 4 bit coloured noise signal to the video data stream. The M×N coloured noise pattern stored in a look-up table is complementary to the spectrum introduced by the 4 bit pattern based dithering inside the display driver circuitry. A possible algorithm to generate the look-up table contents has already been described in Annexes F and G.

Due to the increased entropy of the image or video data the entire image processing system (including image source, optional video processing, display driver circuitry and display device) is capable of displaying more image information more accurately without artifacts.

Some techniques for matching the spectrum of the noise pattern to the spectrum of the dither pattern will now be described.

(1) In many cases, details of the type of spatial dither pattern are provided in documentation provided by the manufacturer of a processing device. By calculating the 2D Fourier transform of the specified pattern the spectral energy peaks can be detected. Usually only a few frequencies have relevant values. The table shown above for the pattern of FIG. 2e is a typical set of high energy peaks. The spectrum of the noise pattern is modified based on this set of energy peaks.

(2) In a case where the dither pattern is not specified it can be measured in several ways. A uniform grey level signal is applied to a device in the processing chain, prior to the dither circuitry. The modulated output is measured. By increasing the uniform input grey level by 1, only 1 pixel in the pattern will light up one step more at the output, indicating the value that was offset by the dither circuit for that pixel.

(3) Another way is to macroscopically look at the screen while applying the suspected dither pattern prior to dithering. Consider one wants to detect the most significant bit of the dither pattern. Assume the suspected equation is line(0) XOR column(0). When this image is generated a checker pattern occurs. Assume the generated image has values alternating between 0 and 0.5. In case the dithering pattern is in phase with the generated input pattern, the image lights up. In case the dithering pattern is in counter phase with the generated input pattern, no effect is visible. This proves the dither pattern equals the suspected pattern. Such a system could be used in an automatic calibration setup when using a light sensor that communicates with a PC. A PC can generate a set of test images and while communicating with a light measuring tool. It can detect the pattern that causes most variation of light output when the pattern phase is inverted. This pattern best matches the dither pattern.

Optimising the Look-Up Table Contents

The (optionally) temporally modulated "magic" properties containing coloured noise pattern can be considered as the inverse entropy of the pattern based dither process present in many practical systems used today as indicated in FIG. 19. The desired spectrum is converted to an M×N impulse response kernel and this M×N noise pattern is encrypted into a look-up table contents. Applying the least significant bits of column and line counter to the look-up table read address bus will cause the read data to behave as the desired noise pattern.

In order to optimize the entropy of the coloured noise pattern it is desirable to optimize its magic properties. As the base for the additive synthesis as described in Annex G does not produce any DC signals and includes multiples of the pattern frequency uniquely the floating point output consequently has some desirable magic properties.

As no DC signal is present in the two spatial dimensions the sum of all noise values in any column or any line equals zero. By applying the quantization process as described in Annex F these magic properties become disturbed. Although the sum of all elements in a specific line or column remains nearly constant after the described quantization process to integer values these sums are not guaranteed to be constant because of the non-linear conversion from floating point values to integers. Because of the random initializations in some part of the program the coloured noise synthesis algorithm as described in Annexes F and G produces a different result each time the code is executed. These different results include slightly different spectral properties as well as slightly different magic properties.

The algorithm can be executed millions of times by a PC and the best result can be picked from millions of generated coloured noise patterns.

The spectral quality can be calculated based on the aberrance compared to the ideal Poisson-disk distribution using the least square error method for instance.

The magic properties can be quantified by adding the deviation from the ideal sum for all columns and lines. Regularly the algorithm produces a coloured noise pattern with constant sum of columns and sum of lines.

Naturally additional computations could further constrain the algorithm to obtain specific magic properties more efficiently although the efficiency of such an algorithm is not really important as the final result is stored in a look-up table. Whether it takes a few seconds or a few days for a computer program to obtain a pattern with every desired property does not influence the final real time performance or the quality improvement achieved by the current invention.

Therefore a more detailed discussion about computational efficiency to obtain a valid noise pattern must not be considered as part of the current invention.

Figure 20:
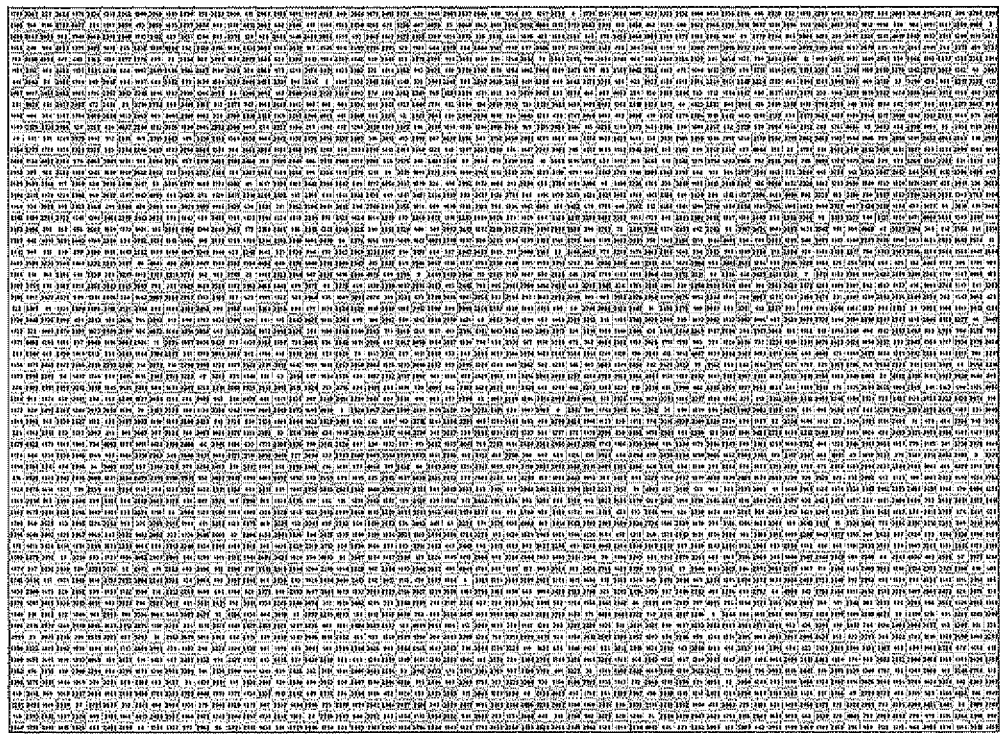
FIG. 20 shows a 64×64 array of values generated using an additive synthesis process with additional constraints.

A typical example of a coloured noise pattern complementing a standard dither method obtained after hundreds of executions of the program in Annex G followed by the code in Annex F is shown in FIG. 20 for a 12 bit 64×64 pattern.

The locations of the upper half of the 12-bit integer numbers are marked in grey to provide a better overview of the value distribution. By highlighting the pattern's most significant bit the spectral distribution becomes more apparent. FIG. 20 clearly indicates the absence of any two-dimensional clusters in the pattern thus images mixed with such a pattern do not appear grainy.

Figure 21:
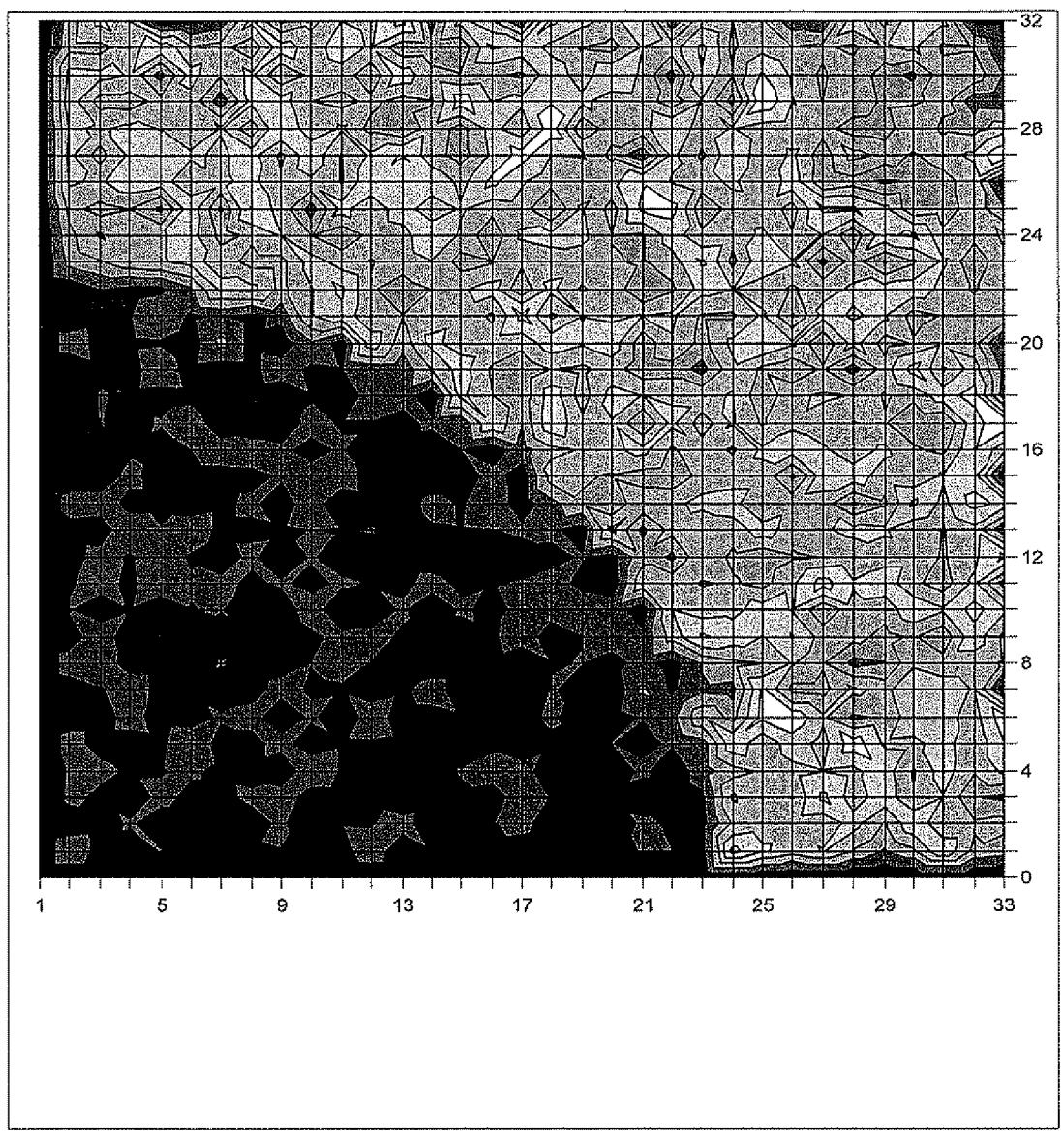
FIG. 21 shows a two-dimensional spectrum corresponding to the array of FIG. 20; and, FIG. 22 shows an example image processing chain in which the invention can be used.

The spectrum of the pattern in FIG. 20 is shown in FIG. 21 and shows a well-approximated Poisson-disk distribution with an additional "magic" property as no energy is found on the axis in the chart indicating the absence of any DC component on top of the average truncation value. As the pattern has 64×64 values all values in a range from 0 to 4095 are included. The average value for the pattern equals 4095 divided by 2. Thus the sum of each row and each column equals 64×2047.5=131040 as can be verified in FIG. 20. This desirable property causes all video lines and columns to be equally quantized in average. Even without temporal modulation of the pattern all lines and columns will be displayed equally bright in average.

Examples of noise pattern arrays have been described with a single occurrence of each value in a linear range, such as a 64×64 array of 12-bit values in the range 0-4095 with each value occurring only once. It is also possible to create an array with multiple occurrences of each value. For example, the same 64×64 array can store 9-bit values, with each value in the range 0-511 ideally occurring 8 times. A simple way of creating these alternative patterns is by truncating the least significant bits of the higher-bit values.

Figure 22:
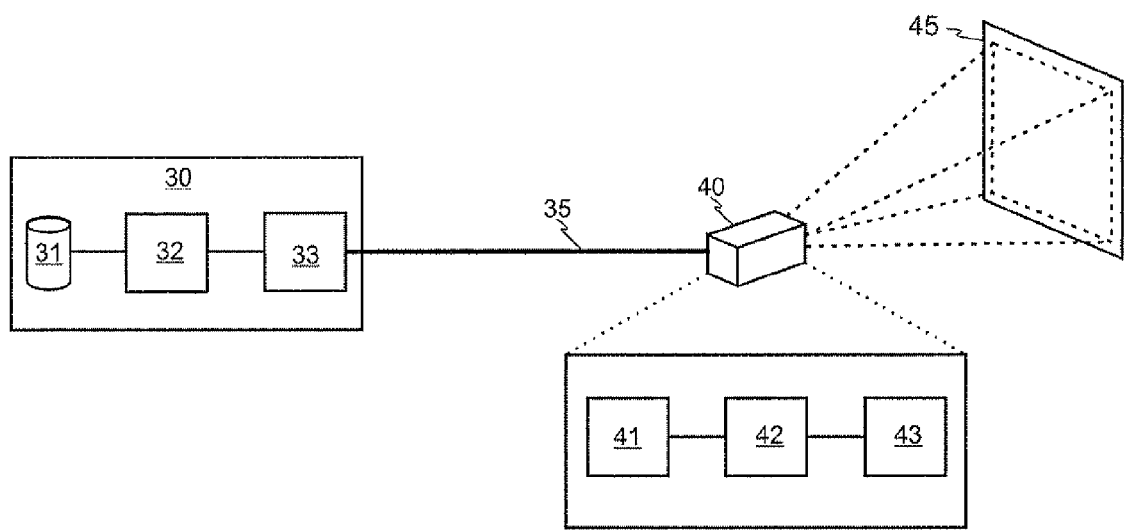

For completeness, FIG. 22 shows an example of an image processing chain in which the invention can be used. An image generator 30 is connected to an image display 40, which in this case is a projector, by an interface 35. Image generator 30 can comprise a media player with a media content store 31 and a processor 32 to construct an image signal. A final processing stage 33 reduces the colour bit depth prior to transmission over interface 35. Processing stage 33 applies a repetitive offset dither pattern to the image signal before reducing the resolution of the image signal. At projector 40, the digital image signal is received and a noise pattern is tiled across the image signal. The noise pattern has a spectrum which is complementary to that of the dither pattern used by processing stage 33. Further processing is applied to the image signal at stage 42. Due to the noise pattern that has been applied at stage 41, the signal input to stage 42 has a more continuous spectrum and the processing applied at stage 42 does not cause visible artifacts. Finally, the digital image signal, in electrical form, is converted to an optical signal for display 45.

The invention is not limited to the embodiments described herein, which may be modified or varied without departing from the scope of the invention.

APPENDIXES

Appendix A

* BASIC Program to generate 16 x 16 white noise including linear quantization constraint *

```
For x = 0 To 15                 ; scans all columns of the array
    For y = 0 To 15             ; scans all lines of the array
        pattern(x, y) = -1      ; initializes all values to -1 to indicate "empty" location
    Next y                      ; -1 will be used to detect empty locations
Next x
For Value = 0 To 255            ; scans all values that must occur in the noise pattern
    Do
        x = Int(Rnd * 16)       ; generates a random column number
        y = Int(Rnd * 16)       ; generates a random line number
    Loop Until pattern(x, y) < 0 ; loops until an "empty" location is found
    pattern(x, y) = Value       ; stores the current value at the empty array location
Next Point
```

Appendix B

* BASIC Program for first order approximation to generate blue noise *

```
For x = 0 To 15                 ; scans all columns of the array
    For y = 0 To 15             ; scans all lines of the array
        DTNUL(x, y) = 100       ; initializes all distances to the nearest used location
        pattern(x, y) = -1      ; initializes all values to -1 to indicate "empty" location
    Next y
Next x
LDTAUL = 100                    ; initializes largest distance to any used location
For Point = 0 To 255            ; scans all values that must occur in the noise pattern
    Do                          ; loops until a valid location is found as explained below
        xc = Int(Rnd * 16)      ; generates a random column number
        yc = Int(Rnd * 16)      ; generates a random line number
    Loop until DTNUL (xc, yc) > LDTAUL * threshold
    pattern(xc, yc) = Point     ; stores the current value at the empty array location
    LDTAUL = 0                  ; reinitializes largest distance to any used location
    For x = 0 To 15             ; scans all columns of the array
        For y = 0 To 15         ; scans all lines of the array
            distance = Sqr((8 - Abs(8 - Abs(x - xc)))^2 + (8 - Abs(8 - Abs(y - yc)))^2)
                                ; calculates the so called pan distance
            If DTNUL (x, y) > distance Then DTNUL (x, y) = distance
                                ; tracks the distance to the nearest used location
            If LDTAUL < DTNUL (x, y) Then LDTAUL = DTNUL (x, y)
                                ; tracks the largest distance to any used location
        Next y
    Next x
Next Point
```

Appendix C

* BASIC Program for blue noise generation *

```
For x = 0 To 15                 ; scans all columns of the array
    For y = 0 To 15             ; scans all lines of the array
        DTNUL(0,x, y) = 100     ; initializes all distances to the nearest low values
        DTNUL(1,x, y) = 100     ; initializes all distances to the nearest high values
```

* BASIC Program for blue noise generation *

```
            pattern(x, y) = -1              ; initializes all values to -1 to indicate "empty" location
        Next y
Next x
LDTAUL(0) = 100                             ; initializes largest distance to any placed low value
LDTAUL(1) = 100                             ; initializes largest distance to any placed high value
For Point_pair = 0 To 127                   ; scans all value pairs
    For Low_high = 0 To 1                   ; this will alternately place low and high value
        Point = Abs(255 * Low_high - Point_pair)
                                            ; when low_high is 1 values are scanned starting at 255
        Do                                  ; loops until the valid location is "empty"
            Do                              ; loops until a valid location is found for low or high
                                              value
                xc = Int(Rnd * 16)          ; generates a random column number
                yc = Int(Rnd * 16)          ; generates a random line number
            Loop Until DTNUL(low_high, xc, yc) > LDTAUL(low_high) * threshold
        Loop Until pattern(xc, yc) < 0
        pattern(xc, yc) = Point             ; stores the current value at the empty array location
        DTNUL(0, xc, yc) = 0                ; sets both DTNUL values to zero as current location...
        DTNUL(1, xc, yc) = 0                ; ...is invalid for both new low and high values
        LDTAUL(0) = 0                       ; reinitializes largest distance to any low value
        LDTAUL(1) = 0                       ; reinitializes largest distance to any high value
        For x = 0 To 15                     ; scans all columns of the array
            For y = 0 To 15                 ; scans all lines of the array
                distance = Sqr((8 - Abs(8 - Abs(x - xc))) ^2 + (8 - Abs(8 - Abs(y - yc))) ^2)
                                            ; calculates the so called pan distance
                If DTNUL(low_high, x, y) > distance Then DTNUL(low_high, x, y) = distance
                                            ; tracks the distance to the nearest low or high location
                If pattern(x, y) < 0 Then   ; ensures that only empty locations are considered
                    If LDTAUL(0) < DTNUL(0, x, y) Then LDTAUL (0) = DTNUL (0, x, y)
                                            ; tracks the largest distance to any placed low value
                    If LDTAUL (1) < DTNUL (1, x, y) Then LDTAUL (1) = DTNUL (1, x, y)
                                            ; tracks the largest distance to any placed high value
                End If
            Next y
        Next x
    Next Low_high
Next Point_pair
```

Appendix D

* BASIC Program to synthesize a Poisson-disk distributed spectrum *

```
golden_ratio = (Sqr(5) - 1) / 2             ; defines the golden ratio number
For x = 0 To 15                             ; scans all columns in the 16x16 pattern
    For y = 0 To 15                         ; scans all lines in the 16x16 pattern
        pattern(x, y) = -10000              ; initializes the 16x16 noise pattern values
                                              the large negative offset simplifies further computations
    Next y
Next x
For Fx = 1 To 8                             ; scans all horizontal frequencies Fx except 0
    For Fy = 1 To 8                         ; scans all horizontal frequencies Fy except 0
        If (Fx ^2 + Fy ^2) > (Poisson_Radius * 8) ^2 Then
                                            ; 2D-frequency must be above specified fraction of maximum frequency
            px = Rnd(1) * 2 * Pi            ; generates a random horizontal phase
            py = Rnd(1) * 2 * Pi            ; generates a random vertical phase
            If Fx = 8 Then ax = golden_ratio Else ax = 1     ; defines horizontal attenuation ax
            If Fy = 8 Then ay = golden_ratio Else ay = 1     ; defines vertical attenuation ax
            For x = 0 To 15                 ; scans all columns in the 16x16 pattern
                For y = 0 To 15             ; scans all lines in the 16x16 pattern
                    pattern(x,y)= pattern(x,y) + Sin(x/8*Fx*Pi+px)* Sin(y/8*Fy*Pi+py)* ax* ay
                                            ; Synthesizes noise pattern by additive mixing of all valid 2D frequencies
                Next y
            Next x
        End If
    Next Fy
Next Fx
```

Appendix E

---
* BASIC Program to convert unequally spread floating point numbers to integers *

---
```
For Value = 0 To 255                            ; scans all 8-bit integer values to obtain
    Min = 1000000                               ; initializes the minimum value as "large enough"
    For x = 0 To 15                             ; scans all columns in the 16×16 pattern
        For y = 0 To 15                         ; scans all lines in the 16×16 pattern
            If pattern(x, y) < Min Then         ; compares current value with minimum
                Min = pattern(x, y)             ; tracks the minimum floating point (FP) value
                min_x = x                       ; tracks the column location of the minimum value
                min_y = y                       ; tracks the line location of the minimum value
            End If
        Next y
    Next x
    pattern(min_x, min_y) = Value               ; replaces minimum FP value by the desired integer
Next Value
```
---

Appendix F

---
* Program to diffuse peak values based on additive synthesized pattern *

---
```
For x = 0 To 15                                 ; scans all columns in the 16×16 pattern
    For y = 0 To 15                             ; scans all lines in the 16×16 pattern
        DTNUL(x, y) = 100                       ; initializes distances to nearest used location
        If pattern(x, y) < 128 Then             ; separates lower 128 values from upper 128 values
            pattern(x, y) = pattern(x, y) – 10000       ; shifts values to large negative
        Else
            pattern(x, y) = pattern(x, y) + 10000       ; shifts values to large positive
        End If
    Next y
Next x
LDTAUL = 100                                    ; initializes largest distance to any used location
For Value = 0 To 127                            ; scans the lower half of 8-bit integer values to obtain
    Min = –1                                    ; initializes the minimum value
    For x = 0 To 15                             ; scans all columns in the 16×16 pattern
        For y = 0 To 15                         ; scans all lines in the 16×16 pattern
            If DTNUL(x, y) >= LDTAUL * threshold Then    ; marks a location as valid
                If Min > pattern(x, y) Then     ; tracks the minimum value found in the valid area
                    Min = pattern(x, y)
                    xc = x                      ; tracks the best location column in the valid area
                    yc = y                      ; tracks the best location line in the valid area
                End If
            End If
        Next y
    Next x
    pattern(xc, yc) = Value                     ; assigns currently scanned value to best found location
    LDTAUL = 0                                  ; initializes largest distance to any used location
    For x = 0 To 15                             ; scans all columns in the 16×16 pattern
        For y = 0 To 15                         ; scans all lines in the 16×16 pattern
            distance = Sqr((8 – Abs(8 – Abs(x – xc))) ^ 2 + (8 – Abs(8 – Abs(y – yc))) ^ 2)
                                                ; calculates the so called pan distance
            If DTNUL(x, y) > distance Then DTNUL(x, y) = distance
                                                ; tracks the distance to the nearest used location
            If (pattern(x, y)<0) and (LDTAUL<DTNUL(x, y)) Then LDTAUL = DTNUL(x, y)
        Next y                                  ; tracks the LDTAUL value when location is valid
    Next x
Next Value
For x = 0 To 15                                 ; scans all columns in the 16×16 pattern
    For y = 0 To 15                             ; scans all lines in the 16×16 pattern
        DTNUL(x, y)= 100                        ; reinitializes distances to nearest used location
    Next y
Next x
LDTAUL = 100                                    ; initializes largest distance to any used location
For Value = 255 To 128 step –1                  ; scans the upper half of 8-bit integer values to obtain
    Max = 256                                   ; initializes the maximum value
    For x = 0 To 15                             ; scans all columns in the 16×16 pattern
        For y = 0 To 15                         ; scans all lines in the 16×16 pattern
            If DTNUL(x, y) >= LDTAUL * threshold Then    ; marks a location as valid
                If Max < pattern(x, y) Then     ; tracks the maximum value found in the valid area
                    Max = pattern(x, y)
                    xc = x                      ; tracks the best location column in the valid area
                    yc = y                      ; tracks the best location line in the valid area
                End If
            End If
```

```
*** Program to diffuse peak values based on additive synthesized pattern ***

Next y
    Next x
    pattern(xc, yc) = Value              ; assigns currently scanned value to best found location
    LDTAUL = 0                            ; initializes largest distance to any used location
    For x = 0 To 15                       ; scans all columns in the 16×16 pattern
        For y = 0 To 15                   ; scans all lines in the 16×16 pattern
            distance = Sqr((8 − Abs(8 − Abs(x − xc)))ˆ2 + (8 − Abs(8 − Abs(y − yc)))ˆ2)
                                          ; calculates the so called pan distance
            If DTNUL(x, y) > distance Then DTNUL(x, y) = distance
                                          ; tracks the distance to the nearest used location
            If (pattern(x, y)>256) and (LDTAUL<DTNUL(x,y)) Then LDTAUL=DTNUL(x, y)
                                          ; tracks the LDTAUL value when location is valid
        Next y
    Next x
Next Value
```

Appendix G

```
* BASIC Code to synthesize blue noise spectrum without specified pattern energy peaks * golden_ratio = (Sqr(5) − 1) / 2          ; defines the golden ratio number
For x = 0 To 15                           ; scans all columns in the 16×16 pattern
    For y = 0 To 15                       ; scans all lines in the 16×16 pattern
        pattern(x, y) = −10000            ; initializes the 16×16 noise pattern values
                                          ; the large negative offset simplifies further
                                            computations
    Next y
Next x
For Fx = 1 To 8                           ; scans all horizontal frequencies Fx except 0
    For Fy = 1 To 8                       ; scans all horizontal frequencies Fy except 0
        If (Fxˆ2 + Fyˆ2) > (Poisson_Radius * 8)ˆ2 Then
                                          ; 2D-frequency must be above specified fraction of maximum frequency
            px = Rnd(1) * 2 * Pi          ; generates a random horizontal phase
            py = Rnd(1) * 2 * Pi          ; generates a random vertical phase
            If Fx = 8 Then ax = golden_ratio Else ax = 1    ; defines horizontal attenuation ax
            If Fy = 8 Then ay = golden_ratio Else ay = 1    ; defines vertical attenuation ax
            If Fx= 8 and Fy= 8 Then ax= 0          ; Completely suppresses Peak(1) in Figure 21
            If Fx= 8 and Fy= 0 Then ax= ax/2       ; Attenuates Peak(2) according to Figure 21
            If Fx= 4 and Fy= 4 Then ax= ax*7/8 ; Attenuates Peak(3) with energy= 0125 in fig. 21
            If Fx= 8 and Fy= 4 Then ax= ax*0.912 ; Attenuates Peak(4) with energy= 0.088 in fig.
                                                    21
            For x = 0 To 15               ; scans all columns in the 16×16 pattern
                For y = 0 To 15           ; scans all lines in the 16×16 pattern
                    pattern(x,y)= pattern(x,y) + Sin(x/8*Fx*Pi+px)* Sin(y/8*Fy*Pi+py)* ax* ay
                                          ; Synthesizes noise pattern by additive mixing of all valid 2D frequencies
                Next y
            Next x
        End If
    Next Fy
Next Fx
```

The invention claimed is:

1. A method of processing a digital image signal comprising applying a noise pattern to the image signal, the noise pattern comprising an array of offset values, the values of the array being arranged in columns and lines and the array of offset values having a range of values and a spectral energy distribution, wherein the noise pattern has the following properties:

the values in the array are linearly distributed across the range of values and each value in the range of values occurs a substantially equal number of times within the array;

values close to or at extreme ends of the range of values are dispersed from each other within the array;

the spectral energy distribution is a substantially Poisson-disk two-dimensional spectral energy distribution; and wherein the noise pattern also has at least one of the following further properties:

values are positioned in the array based on distance to values that are close in value to the respective values in neighbouring repetitions of the array;

a sum of said values in any column of the array is substantially equal to a sum of said values in any other column of the array; and a sum of said values in any line of the array is substantially equal to a sum of said values in any other line of the array.

2. A method according to claim 1 wherein the noise pattern has a coloured noise spectrum.

3. A method according to claim 2 wherein the noise pattern has a blue noise spectrum.

4. A method according to claim 1 wherein the step of applying the noise pattern comprises tiling the noise pattern across the image.

5. A method according to claim 1 wherein the noise pattern is at least a 16×16 array of maximum 8-bit values or at least a 64×64 array of maximum 12-bit values.

6. A digital image processing device comprising a module for applying a noise pattern to a digital image using the method according to claim 1.

7. A video processing device comprising a module for applying a noise pattern to a video signal using the method according to claim 1.

8. A digital image processing device comprising:
- a module for applying a noise pattern to a digital image or video signal the noise pattern comprising an array of offset values, the values of the array being arranged in columns and lines and the array of offset values having a range of values and a spectral energy distribution,
- wherein the module has means for applying the noise pattern with the following properties:
- the values in the array are linearly distributed across the range of values and each value in the range of values occurs a substantially equal number of times within the array;
- values close to or at extreme ends of the range of values are dispersed from each other within the array;
- the spectral energy distribution is a substantially Poisson-disk two-dimensional spectral energy distribution; and
- wherein the noise pattern also has at least one of the following further properties:
- values are positioned in the array based on distance to values that are close in value to the respective values in neighboring repetitions of the array; or
- a sum of said values in any column of the array is substantially equal to a sum of said values in any other column of the array and a sum of said values in any line of the array is substantially equal to a sum of said values in any other line of the array.

9. The digital image processing device according to claim 8 wherein the noise pattern has a coloured noise spectrum.

10. The digital image processing device according to claim 9 wherein the noise pattern has a blue noise spectrum.

11. The digital image processing device according to claim 9 wherein the means for applying the noise pattern is adapted to apply the noise pattern by tiling the noise pattern across the image.

12. The digital image processing device according to claim 9 wherein the noise pattern is at least a 16×16 array of maximum 8-bit values or at least a 64×64 array of maximum 12-bit values.

* * * * *